(12) United States Patent
Mutlu et al.

(10) Patent No.: US 10,824,275 B2
(45) Date of Patent: Nov. 3, 2020

(54) WAVEGUIDE-BASED INTERFEROMETRIC MULTI-POINT/DISTRIBUTED FORCE AND TOUCH SENSORS

(71) Applicant: Apple Inc., Cupertino, CA (US)

(72) Inventors: Mehmet Mutlu, Stanford, CA (US); Tong Chen, Cupertino, CA (US); Mark T. Winkler, San Jose, CA (US); Omid Momtahan, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 16/141,888

(22) Filed: Sep. 25, 2018

(65) Prior Publication Data

US 2020/0097124 A1    Mar. 26, 2020

(51) Int. Cl.
*G06F 3/042* (2006.01)
*G02B 6/42* (2006.01)

(52) U.S. Cl.
CPC ............ *G06F 3/0421* (2013.01); *G02B 6/42* (2013.01); *G02B 6/4214* (2013.01); *G02B 6/4215* (2013.01)

(58) Field of Classification Search
None
See application file for complete search history.

(56) References Cited

U.S. PATENT DOCUMENTS

| | | | |
|---|---|---|---|
| 6,707,027 B2 | 3/2004 | Liess et al. | |
| 6,816,523 B1 | 11/2004 | Glenn et al. | |
| 7,557,795 B2 | 7/2009 | Kong et al. | |
| 7,995,193 B2 | 8/2011 | Kuwata | |
| 8,529,460 B2 | 9/2013 | Kawano et al. | |
| 8,736,581 B2 | 5/2014 | Han et al. | |
| 9,453,939 B2 | 9/2016 | Tortora et al. | |
| 9,547,280 B2 | 1/2017 | Born et al. | |
| 10,627,961 B2 | 4/2020 | Mutlu et al. | |
| 2003/0067760 A1* | 4/2003 | Jagt | G02B 6/0056 362/606 |
| 2005/0157971 A1 | 7/2005 | Juijve et al. | |

(Continued)

FOREIGN PATENT DOCUMENTS

| | | |
|---|---|---|
| CH | 706101 | 12/1978 |
| WO | WO 10/001299 | 1/2010 |
| WO | WO 17/178711 | 10/2017 |

OTHER PUBLICATIONS

U.S. Appl. No. 16/141,912, filed Sep. 25, 2018, Mutlu et al.

(Continued)

*Primary Examiner* — Parul H Gupta
(74) *Attorney, Agent, or Firm* — Brownstein Hyatt Farber Schreck, LLP

(57) ABSTRACT

Disclosed herein are structures, devices, and systems for detecting touch and force inputs at multiple sensing locations on a surface of an electronic device using waveguide-based interferometry. A laser light source, such as a VCSEL, inserts light into a waveguide positioned adjacent to the sensing locations, and an input at a sensing location alters the inserted light in the waveguide allowing for determination of the input's touch or force at the sensing location. Wavelength modulation of the inserted light allows isolation in frequency of the signals from each sensing location. Optical phase locking can be used to lock an absolute distance beat frequency corresponding to a stationary reference point in the waveguide.

20 Claims, 17 Drawing Sheets

(56) References Cited

U.S. PATENT DOCUMENTS

| | | | |
|---|---|---|---|
| 2012/0200858 A1* | 8/2012 | Pruijmboom | G01B 9/02028 |
| | | | 356/477 |
| 2014/0098058 A1* | 4/2014 | Baharav | G06F 3/0421 |
| | | | 345/174 |
| 2017/0059477 A1* | 3/2017 | Feitisch | G01N 21/274 |
| 2018/0080758 A1 | 3/2018 | Chen et al. | |
| 2018/0224368 A1 | 8/2018 | Spruit et al. | |
| 2019/0137692 A1 | 5/2019 | Tu | |

OTHER PUBLICATIONS

U.S. Appl. No. 16/230,967, filed Dec. 21, 2018, Huang et al.

Liess et al., "A miniaturized multidirectional optical motion sensor and input device based on laser self-mixing," *Measurement Science and Technology*, vol. 13, 2002, pp. 2001-2006.

Lim et al, "Displacement and Distance Measurement Using the Change in Junction Voltage Across a Laser Diode due to the Self-Mixing Effect," Proceeding of SPIE, vol. 6038, 603810, 2006, 10 pages.

\* cited by examiner

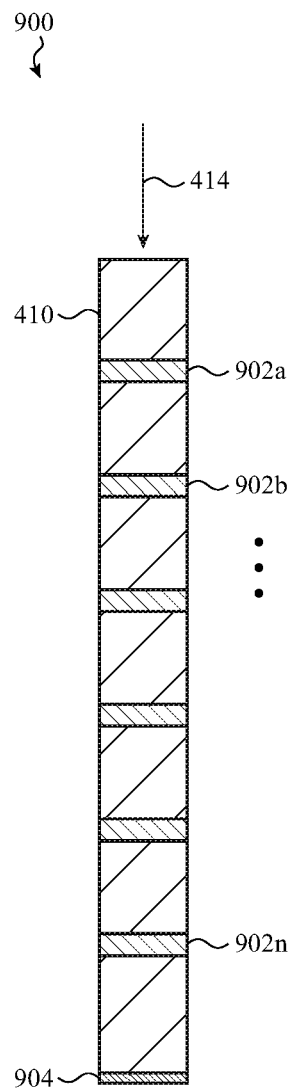 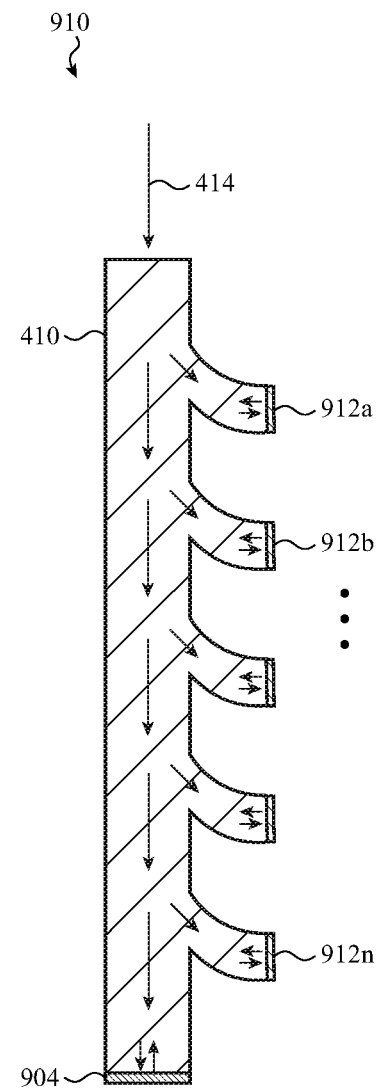
*FIG. 9A*  *FIG. 9B*

WAVEGUIDE-BASED INTERFEROMETRIC MULTI-POINT/DISTRIBUTED FORCE AND TOUCH SENSORS

FIELD

The present disclosure generally relates to force and touch sensors that use self-mixing interferometry of laser diodes to detect force or touch on input surfaces or displays of electronic devices. The force or touch inputs may be detected at multiple points on the surface or display by using a waveguide to direct the light emitted by the laser diodes.

BACKGROUND

Many electronic devices, such as cell phones, smart watches, tablet computers, and personal digital assistants, have input surfaces or displays through which a user may interact with the electronic device by applying a press or touch force. The location and/or strength of the touch on the input surface can be related to the action to be performed by the electronic device. Some known sensor mechanisms for detecting the location and strength of the touch on the input surface may use technologies based on capacitance changes or on piezoelectric or piezoresistive changes in sensors placed near the input surface.

Other sensor mechanisms may involve light-based measurements. An emitted light, such as laser light, may be reflected, scattered, or otherwise altered, with the alteration related to the distance from the cause of the alteration. In some embodiments, a reflection of a laser light emitted from a laser diode can be detected either by a photodetector or by undergoing self-mixing interference with the laser itself. In the case of a display surface, a touch by a user on the input surface can cause a deflection of the input surface or may modify the reflection properties of the light from the input surface. The deflection or modification can cause an alteration in a laser light directed toward the input surface. Such light-based sensor mechanisms may offer sensitive and reliable detection of a touch, scroll, or applied force on an input surface.

Examples of such light-based sensors may include LIDAR systems. Such light-based sensor mechanisms may be configured to measure distance or displacement of just a single location on a target object. In the case of a user input surface, detecting a user input at a large number of locations across the user input surface would require a corresponding number of light-based sensor mechanisms that each detect distance or displacement from a respective single location on a target object. Various embodiments disclosed herein are directed to light-based sensor mechanisms that may measure distance, displacement, or speed of movement at multiple locations on a target object using a single laser light source.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Disclosed herein are devices, systems, and methods for detecting user inputs on an input surface of an electronic device by using self-mixing interferometry.

More specifically, described herein is an electronic device comprising an input surface, an optical waveguide positioned interior to the electronic device in proximity to the input surface, and a laser light source operable to insert light into the optical waveguide at an insertion location of the optical waveguide. The optical waveguide comprises a full or partial reflector positioned at a first distance from the insertion location of the optical waveguide, and a plurality of light out-couplers positioned adjacent to respective sensing locations on the input surface at respective distinct distances along the waveguide, the distinct distances being less than the first distance. A user input on the input surface at a first sensing location of the respective sensing locations changes an operational parameter of the laser light source that is detected by the processing electronics.

The light out-couplers may be transmissive, reflective or an in-waveguide Bragg gratings. The laser light source may be a vertical cavity, surface emitting laser diode (VCSEL). The processing electronics can apply a spectrum analysis to a signal of an operational parameter of the laser light source and determine a sensing location based on the spectrum analysis.

Also disclosed is a method for detecting a force applied on a surface of an electronic device. The method can include inserting laser light from a laser light source into an optical waveguide adjacent to the surface, receiving, into the optical waveguide, a reflected light from the surface, measuring an operational parameter of the laser light source that varies with self-mixing in the laser light source and estimating the force applied on the surface based on the measured operational parameter. The optical waveguide comprises multiple light out-couplers, each light out-coupler operable to direct a respective portion of the inserted laser light from the optical waveguide toward the surface, the reflected light is a reflection of the respective portion of the inserted laser light corresponding to a first light out-coupler, and the reflected light and the existing light within the laser undergo self-mixing inside the laser light source.

The method can further include obtaining a spectrum analysis of the measured operational parameter, determining, based on the spectrum analysis, that the force has caused a change in the measured operational parameter, and determining a location on the surface at which the force was applied, based on the spectrum analysis.

Also disclosed is an electronic device with an input surface having a reflective coating, an optical waveguide positioned in proximity to the reflective coating and including a set of light out-couplers, an in-coupler element operably connected to the optical waveguide, a laser diode operable to insert light into the optical waveguide through the in-coupler element, and processor coupled to the laser diode and operable to detect a location at which a force is applied to the input surface based on a detected alteration in an operational parameter of the laser diode.

The optical waveguide is configured to receive reflections of light from the reflective coating of the input surface, direct the reflections into the laser diode, and detect alteration in the operational parameter resulting from self-mixing in the laser diode of the inserted light with the reflections.

BRIEF DESCRIPTION OF THE DRAWINGS

The disclosure will be readily understood by the following detailed description in conjunction with the accompanying drawings, wherein like reference numerals designate like structural elements.

FIG. 9A shows a top view of a linear configuration of an optical waveguide as it can be positioned with respect to an input surface, according to an embodiment.

FIG. 9B shows a top view of a quasi-linear configuration of an optical waveguide as it can be positioned with respect to an input surface, according to an embodiment.

Figure 1A:
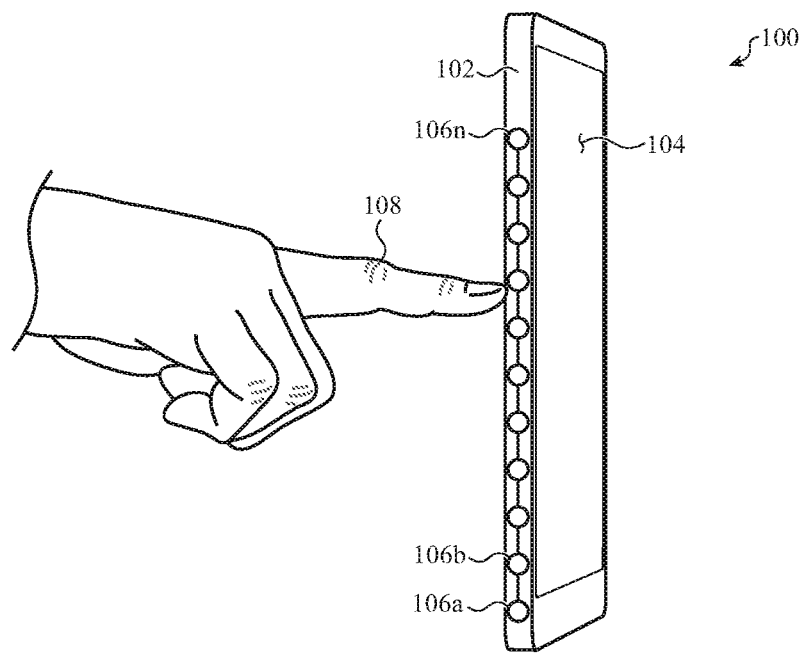
FIG. 1A illustrates an input surface located along the side of an electronic device, according to an embodiment.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to devices, methods, and systems—and electronic devices having them—that can detect a press, touch, or other input on input surfaces, such as display surfaces of the electronic devices. The devices, methods, and systems may include an optical waveguide, positioned on or adjacent to the input surface, into which a laser diode inserts light. The light may be inserted and undergo total internal reflections as it traverses the length of the optical waveguide until, in some embodiments, it reflects from a full or partial reflector at an end of the optical waveguide, the end being at a known distance from the insertion location of the light (e.g., from the diode). In the absence of a user's touch on the input surface, the inserted light that is reflected from the reflector may be received back into the lasing cavity of the laser diode to cause self-mixing interference of the light existing within the laser cavity and the reflected light. Such self-mixing interference can alter an operational parameter of the laser diode. The altered operational parameter may be detected by processing electronics coupled with the laser diode. The detected alteration in the operational parameter may be correlated with the known distance to the reflector from the insertion location.

The optical waveguide may also include one or multiple light out-coupling elements. The light out-coupling elements may be transmissive light out-coupling elements, reflective light out-coupling elements, in-waveguide tilted Bragg gratings, or another type. The light out-coupling elements may be positioned in the optical waveguide at or near respective input sensing positions on the input surface. Hereinafter, a light out-coupling element will be referred to as a light out-coupler. When a user presses or otherwise touches the input surface at a sensing location near a particular light out-coupler, light in the waveguide can exit the waveguide at the location of that light out-coupler and, in some of the embodiments, be reflected back into the waveguide such as from a user's finger. When the amount of reflection arriving back to the laser light source from a particular sensing location changes, a different change in the operational parameter of the laser light source may be induced. Based on the difference in the changed operational parameter, the particular light out-coupler associated with the sensing location can be determined, and from that the location and/or magnitude of the user's press or touch on the input surface can be determined.

A single laser light source and waveguide with multiple light out-couplers can be used to detect an input along an input surface having a one-dimensional extent, such as an input surface configured as a slider button. For an input surface extending in two dimensions (e.g., a display surface), multiple such configurations can be arranged in parallel columns to detect location of an input on the input surface in both directions. Other configurations for detecting an input location in two dimensions will be described below.

Although specific electronic devices are shown in the figures and described below, the devices, methods, and systems described herein may be used with various electronic devices including, but not limited to, mobile phones, personal digital assistants, a time keeping device, a health monitoring device, a wearable electronic device, a desktop computer, and so on.

These and other embodiments are discussed below with reference to FIGS. 1A-10C. However, those skilled in the art will readily appreciate that the detailed description given herein with respect to these Figures is for explanatory purposes only and should not be construed as limiting. The description that follows is organized in three sections: (I) a section describing self-mixing interference in a laser diode to determine distance and/or velocity of a single point on an object, (II) a section describing interferometry devices and methods for detection of a user input at multiple sensing locations using a single laser diode and an optical waveguide, and (III) a section describing hybrid devices and methods that may also make use of deflections of the input surface in concert with the devices and methods described in (II).

FIG. 1A shows a partial side view of an electronic device. The electronic device in this case is a smart phone 100 having an input or display surface 104. The display surface 104 may also be operable to detect user inputs such as by finger or stylus presses (e.g., force and/or touch inputs). The smart phone 100 also has a side 102 configured to detect such user inputs. The side 102 includes multiple sensing locations 106a-106n. A press or touch by a user, such as by a user's finger 108, can provide various inputs or command signals to the smart phone 100. The user's finger 108 can also provide a scroll input across the sensing locations 106a-106n. The various embodiments described herein are directed to detecting the position and speed of the user's finger 108 (or other input device) along the sensing locations 106a-106n using a set of light based sensors.

Figure 1B:
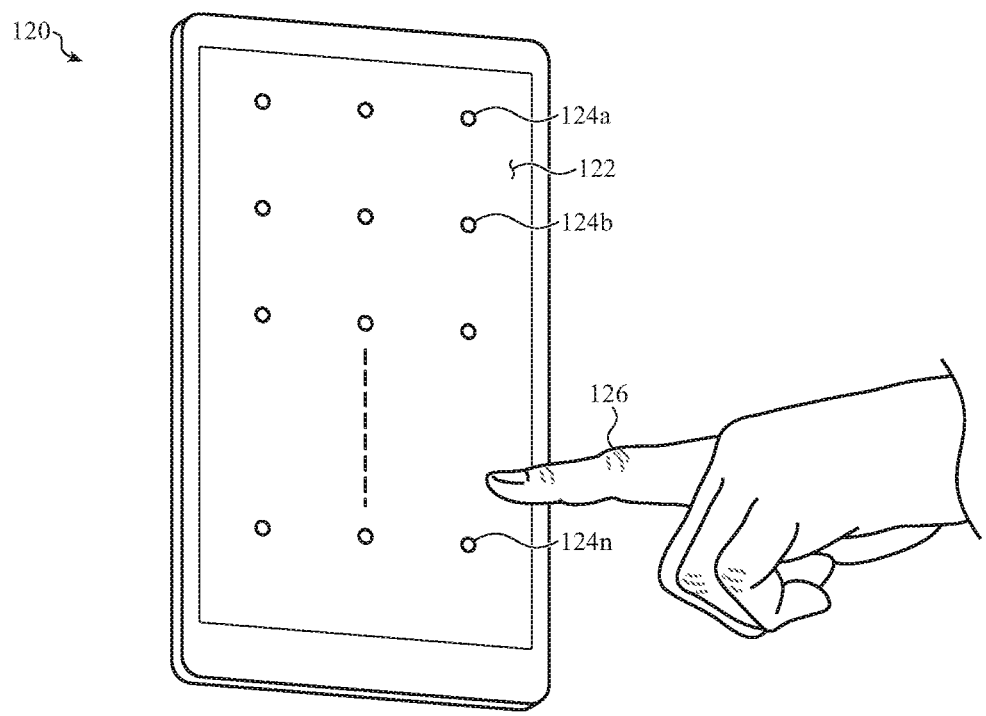
FIG. 1B illustrates a display input surface on an electronic device, according to an embodiment.

FIG. 1B shows a front of a sample electronic device. The electronic device in this case is a smart phone 120 having an input or display surface 122. The display surface 122 may be configured with multiple sensing locations 124a-124n at which a user input may be detected. Such a user input may be provided by a touch or press from a user's finger 126, by a stylus, or other means. While the sensing locations 124a-124n are shown arranged in a single column on the display surface 122, it will be clear that further sensing locations may also be on the display surface 122. The other sensing locations may be arranged in other columns parallel to the sensing locations 124a-124n to form a grid pattern. Alternatively, all sensing locations on the display surface 122 may be configured in a different pattern to detect user inputs on the display surface 122, such as in shifted columns, or at vertices of a repeated hexagonal pattern, or in another pattern.

Though FIGS. 1A-B show smart phones, it is clear that the embodiments described herein can be used in other types of electronic devices, such as personal digital assistants, electronic styluses or pencils, laptop computer, media players, wearable devices, or other devices.

Figure 2A:
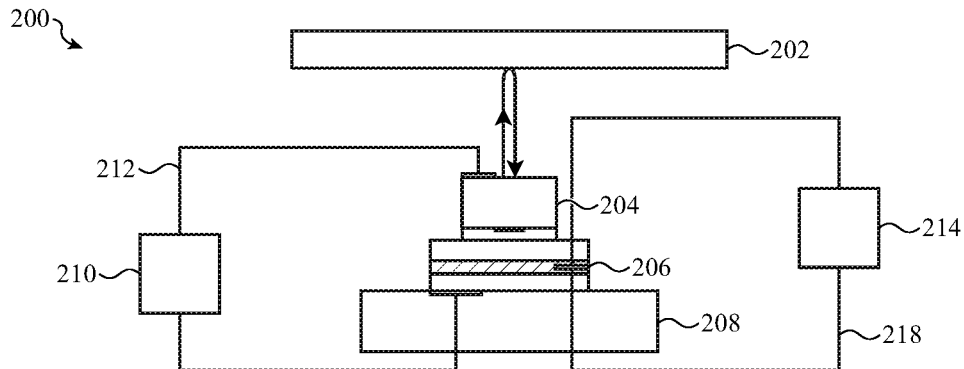
FIG. 2A illustrates a configuration of a laser diode and associated circuitry for detecting inputs on an input or display surface, according to an embodiment.

I. Self-Mixing Interferometry for Distance and Motion Detection at Single Sensing Location FIG. 2A shows a configuration of a system 200 within an electronic device for detecting a user input on an input surface 202. The system 200 uses a laser light source 204 to detect deflections of the input surface 202 caused by a user's press or touch. In some embodiments the laser light source 204 is a vertical cavity, surface-emitting laser (VCSEL) diode, though other types of laser light sources (e.g., edge emitting lasers, quantum cascade lasers, quantum dot lasers, or another type) may be used in other embodiments. In lasers, an input energy source causes a gain material within a cavity to emit light. Mirrors (or other reflective surfaces or structures) on ends of the cavity feed the light back into the gain material to cause amplification of the light and to cause the light to become coherent and (mostly) have a single wavelength. An aperture in one of the mirrors allows transmission of the laser light toward a touch input surface.

In the embodiment of FIG. 2A, the laser light source 204 is configured to emit laser light 214 approximately perpendicularly toward the input surface 202 so that reflections of the emitted laser light 214 are efficiently received back into the lasing cavity of the laser light source 204. Hereinafter, "laser cavity" will also be used to refer to the lasing cavity of the laser light source 204. Such reception of reflected emitted laser light can cause self-mixing interference of the existing laser light within the laser cavity with the received reflected light. As described further below, such self-mixing interference can cause the laser light source's 204 emitted laser light 214 to shift to a steady state optical power different from the emitted power in the absence of received reflections. In addition, self-mixing can cause the laser light source's emitted laser light 214 to shift to a steady state emitted wavelength (or equivalently, frequency) different from the wavelength emitted in the absence of received reflections. Self-mixing interference can also result in a change of the voltage across the laser light source 204 (when the laser light source 204 is driven at a constant current)

and/or a change of the current flowing through the laser light source 204 (when the laser light source 204 is driven at a constant voltage).

The laser light source 204 may be powered by drive electronics 210, which may be coupled to the laser light source 204 by primary connections 212. The primary connections 212 may be wires, leads on a printed circuit board, or another connection. The drive electronics 210 may provide a bias voltage and/or bias current to the laser light source 204. The drive electronics 210 may also be operable to detect changes in an electrical parameter of the laser light source 204 caused by self-mixing interference of cavity light and reflected laser light, such as junction voltage, bias current, power, or another electrical parameter.

The system 200 may also include a photodetector 206 operable to detect reflections of the emitted laser light 214. The photodetector 206 may be included as part of the laser light source 204, or may be a separate component. The photodetector 206 can be coupled with detection electronics 216 by secondary photodetector connections 218 that can supply voltage, current, and/or power. The detection electronics 216 may also be operable to detect signals from the photodetector 206 over the secondary photodetector connections 218 resulting from received reflections of the emitted laser light 214.

In the configuration of the system 200 shown in FIG. 2A, the laser light source 204 is combined with the photodetector 206 and mounted on a support 208. The support 208 may be a printed circuit board, a part thereof, or any other suitable structure such as a brace or plate, within an electronic device using the system 200.

Figure 2B:
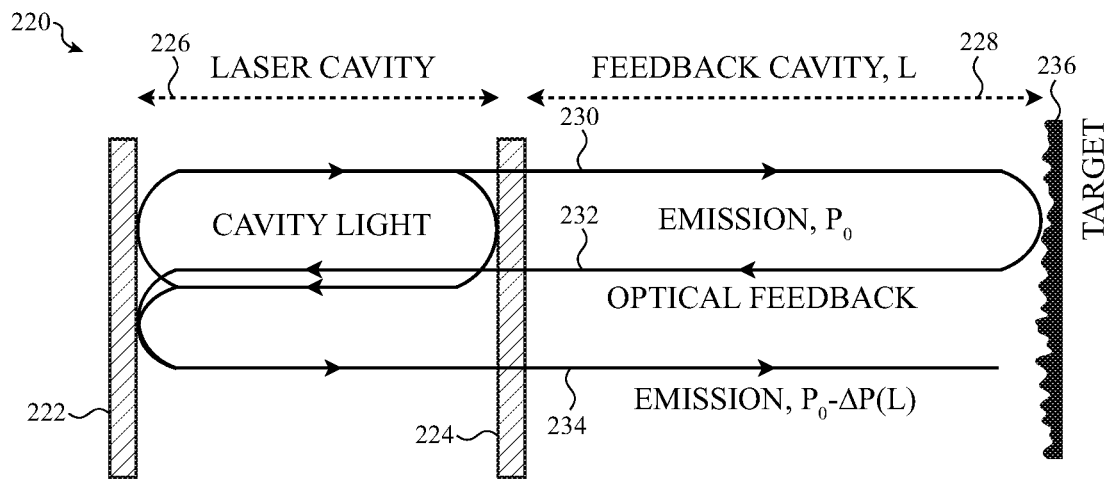
FIG. 2B illustrates properties of self-mixing interference of a laser diode due to a stationary target, according to an embodiment.

FIG. 2B illustrates an operational diagram 220 of self-mixing interference of laser light within the laser cavity 226 with reflected laser light. Hereinafter, solely for simplicity of terminology, the laser light source 204 will be assumed to be a VCSEL. In FIG. 2B, the lasing cavity 226 has been reoriented so that emitted laser light 230 is emitted from the lasing cavity 226 to the right. The lasing cavity 226 has a fixed length between mirrors 222 and 224 established at manufacture. In a typical VCSEL, mirrors 222 and 224 are implemented using the principles of distributed Bragg reflectors. The emitted laser light 230 travels away from the lasing cavity 226 until it intersects or impinges on a target, which may be an input surface 202 of FIG. 2A. The gap of distance L from the emission point through the mirror 224 of the emitted laser light 230 to the target 236 is termed the optical feedback cavity 228. The length L of the optical feedback cavity 228 is variable as the target 236 can move with respect to the laser light source 204.

A reflection from the target 236 of the initially emitted laser light 230 produces a reflected light 232 that can be received back into the lasing cavity 226 by the laser diode. Such a reception is made possible owing to the partial transmittance of mirror 224 that is required to emit the laser light 230 initially. The reflected light 232 enters the lasing cavity 226 to interact with the cavity light. This results in a combined emitted laser light 234. The combined emitted laser light 234 may have characteristics (e.g., a wavelength or optical power) that differ from what the emitted laser light 230 would have in the absence of the optical feedback resulting from the reflected light 232.

Figure 2C:
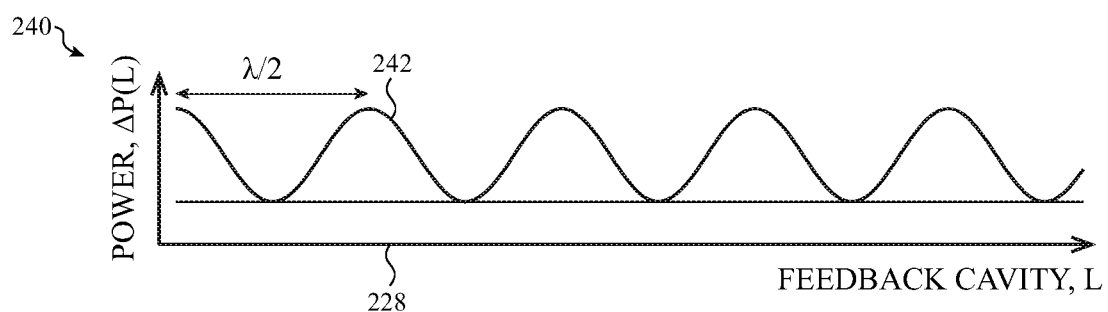
FIG. 2C illustrates variation in an electrical parameter due to self-mixing interference in a laser diode as a function of the feedback cavity length for a stationary target, according to an embodiment.

FIG. 2C is a graph 240 showing the variation in power 242 of the combined emitted laser light 234 as a function of the length L of the optical feedback cavity 228, i.e., the distance from the emission point through the mirror 224 of the emitted laser light 230 to the target 236. The graph 240 depicts a predominantly sinusoidal variation with a period of $\lambda/2$. When the optical feedback resulting from the reflected light 232 is very weak, theoretical considerations imply that the variation is given by the proportionality relationship: $\Delta P \propto \cos(4\pi L/\lambda)$. This relationship generally holds in the absence of a strong specular reflection. In the case of such strong specular reflection, the cosine may become distorted, i.e., higher harmonics may be present in the relationship. However, the peak-to-peak separation stays at $\lambda/2$. For a stationary target, this relationship can be used to determine that a deflection has occurred. In conjunction with other techniques, such as counting of the completed number of periods, the absolute distance of the deflection may also be determined, as will now be explained. The case of a non-stationary target, such as during a scroll or drag operation of a user press, is explained below in relation to FIGS. 3A-B.

The configuration of FIG. 2B can be used for determination of the absolute distance between the laser light source 204 and the target 236 in the stationary case. The wavelength (equivalently, frequency) of the emitted laser light 230 is varied in time, such as by driving the laser light source 204 with a time varying voltage or bias current. As the wavelength of the emitted light varies, resonant modes are generated in the laser cavity 226. The frequency spacing between the resonant modes can be related to the absolute distance to the target 236. This and other information can be obtained by applying a spectrum analysis (such as with a Fast Fourier Transform) to the power signal 242 (or the signal of another electrical parameter). The largest magnitude peak in the spectrum analysis corresponds to the frequency spacing. Other methods to obtain the frequency spacing between the resonant modes may also be used, such as by directly counting a number of peaks in the differentiated signal within a period of time.

Figure 3A:
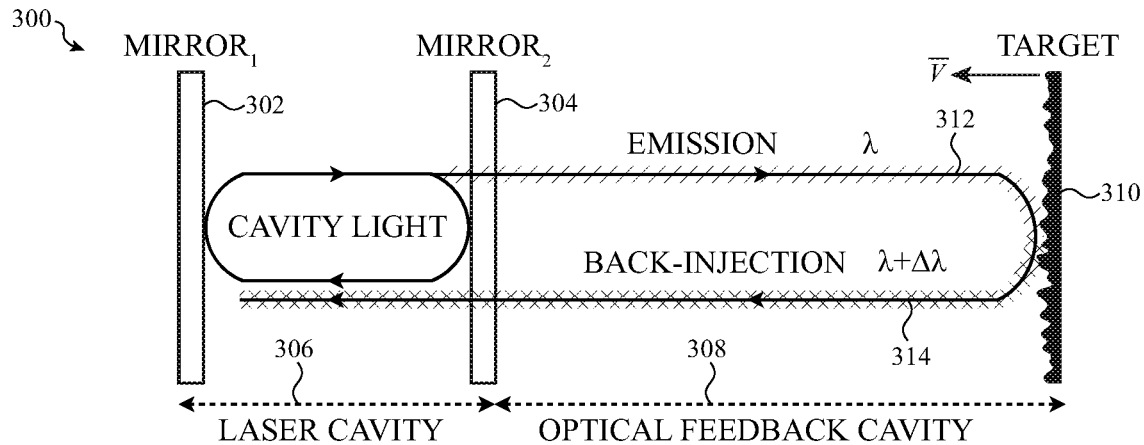
FIG. 3A illustrates properties of self-mixing interference in a laser diode when a target object is in motion, and graphs of correlated time variation and spectrum analysis, according to an embodiment.
Figure 3A:
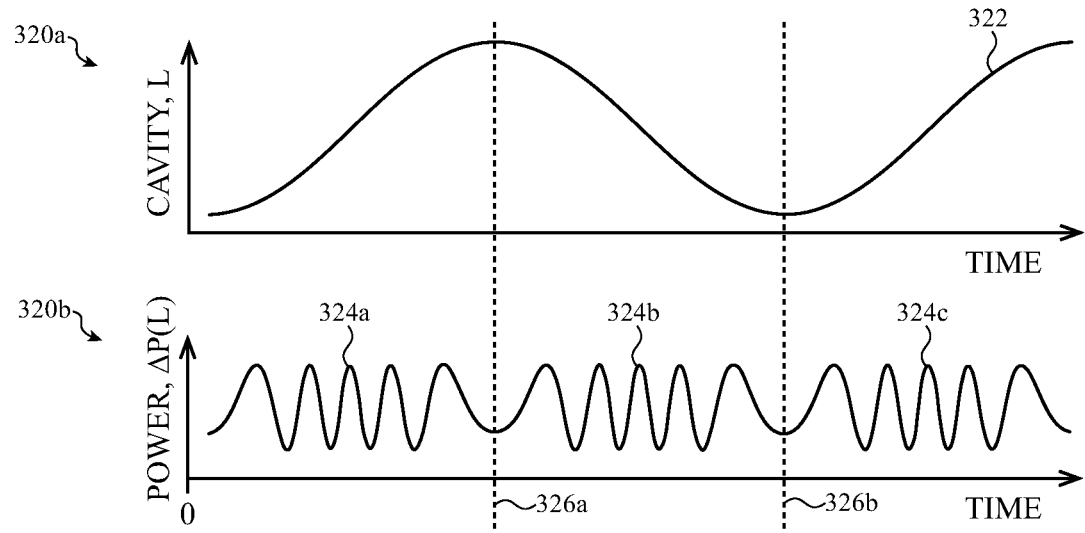
Figure 3A:
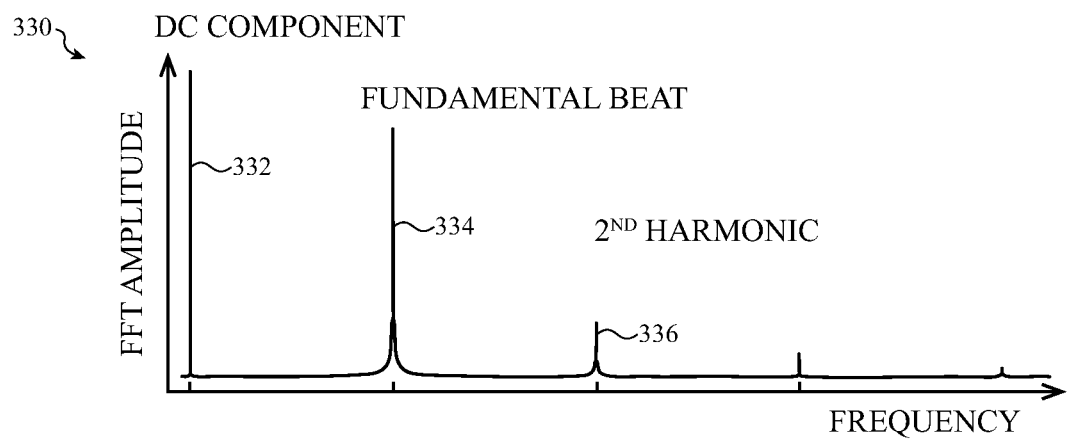

FIG. 3A shows the configuration discussed in relation to FIG. 2B in the case that the target is now moving. This configuration can represent the situation while an input surface or display surface of an electronic device is being touched or pressed. At the top subfigure of FIG. 3A is a configuration 300 similar to that of FIG. 2B. A laser light source has a laser cavity 306 between a first mirror 302 and a second mirror 304, and is driven to produce an emitted laser light 312 with a wavelength $\lambda$ in the case of no reflections. In the case shown, a target 310 is positioned to cause reflections of the emitted laser light 312 and is moving with a velocity $\overline{v}$. Movement of the target 310 causes shortening of the optical feedback cavity 308 and causes the reflected laser light 314 of the emitted laser light 312 to be Doppler shifted to a wavelength $\lambda+\Delta\lambda$ as the reflected laser light 314 reenters the laser cavity 306 to undergo self-mixing.

The second subfigure of FIG. 3A has time correlated graphs 320a and 320b showing, in 320a, the length of the optical feedback cavity 308 as a function of time, and, in 320b, a corresponding change in power produced by motion of the target 310. During a first time interval up to the time 326a, the target 310 moves away from the laser light source, during a second time interval from time 326a to time 326b the target 310 moves toward the laser light source, and after time 326b the target 310 again moves away from the target 310. The power may be that consumed by the laser diode, as detected by associated electronics, or that of the reflected light and/or cavity light, as detected by a photodetector. Another property of the laser diode, such as the junction voltage or the bias current, may be measured instead. The cavity length L of the optical feedback cavity 308 is shown undergoing a sinusoidal motion 322 as the target 310 moves alternately away and toward the laser light source. This induces oscillatory motions 324a-c in the power. The changes in the direction of motion of the target 310 can induce a phase change between the oscillatory motions 324a and 324b, and between oscillatory motions 324b and 324c, as described further below.

The third subfigure of FIG. 3A shows a graph 330 of the magnitude of the spectrum of a power signal obtained when the length of the optical feedback cavity 308 changes linearly in time, as may be calculated with a Fast Fourier Transform (FFT) of samples of the power signal. The spectrum shows a first spectral peak 332 corresponding to the DC component of the power signal, and a first harmonic peak 334 corresponding to the speed of the target 310. Other spectral peaks, such as a second harmonic peak 336, may also be present in the spectrum of the power signal depending on the optical power of the reflected laser light 314.

Figure 3B:
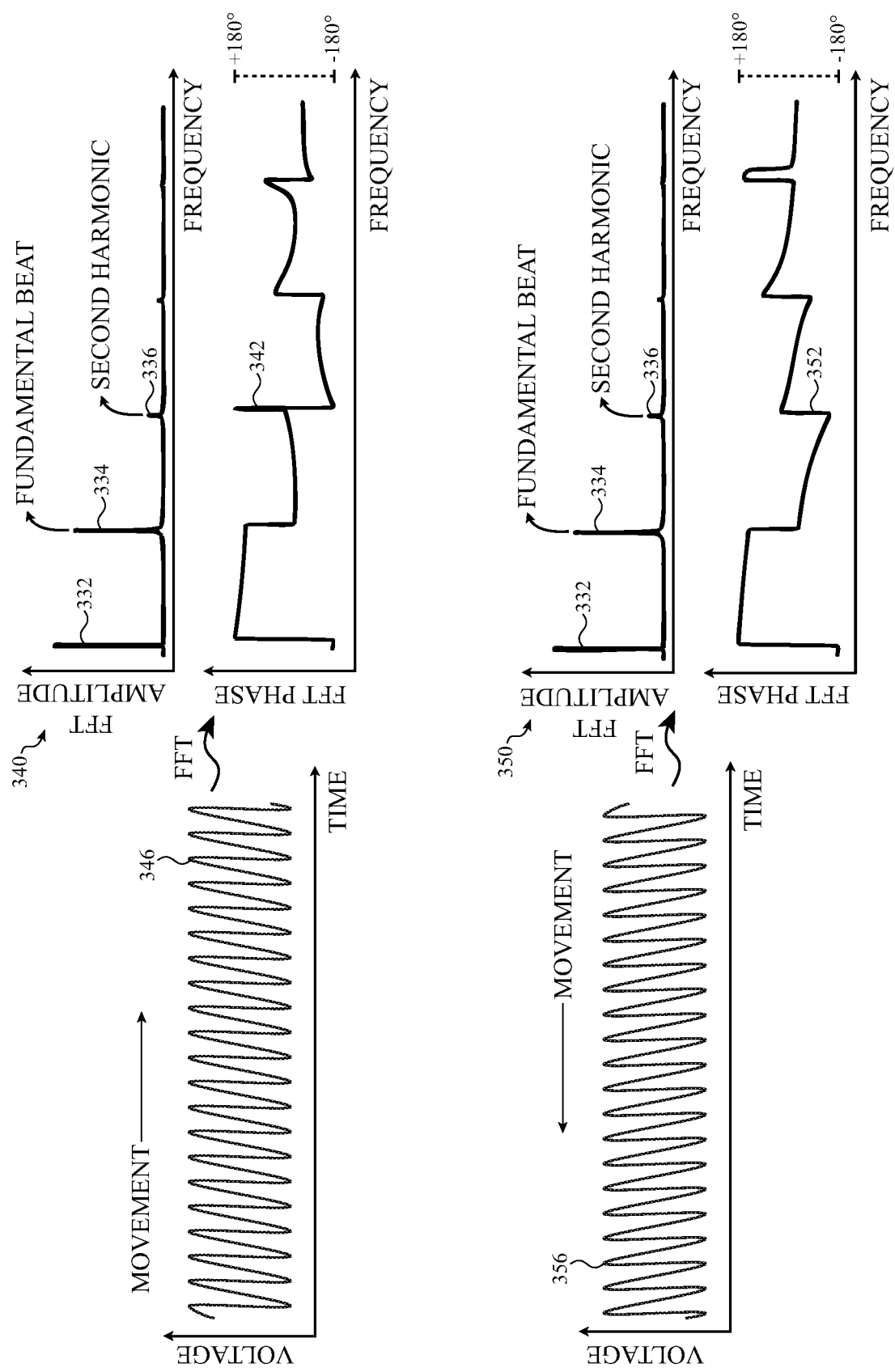
FIG. 3B illustrates graphs of properties of self-mixing interference in a laser diode when a target object is in motion, according to an embodiment.

FIG. 3B shows a top subfigure and a bottom subfigure illustrating how movement and/or direction of movement of a target object, such as target 310, can be detected in a system using self-mixing of a laser light source for detecting user inputs. The top graph shows a frequency correlated magnitude spectrum and phase graph 340, such as may be obtained, in one embodiment, from a spectrum analysis of the junction voltage versus time signal 346 of a system using a VCSEL diode as a laser light source. In the situation shown, the target 310 is moving toward the laser light source. The magnitude spectrum shows the DC component 332, a first harmonic peak 334 of the fundamental beat, and a second harmonic peak 336 corresponding to a second harmonic, as described above in relation to FIG. 3A.

The bottom subfigure in FIG. 3B shows a corresponding frequency correlated magnitude spectrum and phase plot in graph 350, of the junction voltage versus time signal 356 as the target 310 is instead moving away from the laser light source at approximately the same speed. The magnitude spectrum shows similar spectral peaks as when the target 310 was moving toward the laser light source: the DC component 332, the first harmonic peak 334 of the fundamental beat, and the second harmonic peak 336 corresponding to the second harmonic.

However, a phase change at the second harmonic can differ depending on the direction of movement of the target 310 relative to the laser light source. The direction can be obtained by calculating:

2×phase{Fundamental Harmonic}−phase{Second Harmonic}.

When this value is greater than zero, the target is moving toward the laser light source, whereas when the value is less than zero, the target is moving away from the laser light source. Next, the specific examples shown in the phase plot of graphs 340 and 350 is from an example spectrum analysis performed on a voltage signal induced by the target moving in the opposite of the first direction with respect to the laser. The calculation of the above quantity in this case will be less than zero.

II. Single Source and Optical Waveguide for User Input Detection at Multiple Sensing Locations The devices, systems, and methods just described are directed toward detecting displacement or motion of a single point on an input or display surface using a single laser light source, such as a VCSEL diode, directed toward that single point. For electronic devices having a display surface or user input surface covering an area, or an elongated strip for user input, such as shown in FIG. 1A, there would be a need for a large number of sensing locations in order to determine a location on a user touch, press, or other input on the user input surface. The embodiments to be described now describe how a single laser light source can be used for detecting user inputs at multiple sensing locations on the display surface or user input surface. Hereinafter, an "input surface" will refer to components of electronic devices on which a force, press, touch, scroll, or other contact by a user is provided to implement a command or operational input. Such an input surface can refer to a combination of a cover glass in combination with display electronics, as well as other layers.

FIGS. 4A-D illustrate a family of embodiments having an input surface that has limited flexibility. The input surface may be light transmissive to the wavelength of the laser light, and transmissive or non-transmissive to light at other wavelengths.

Figure 4A:
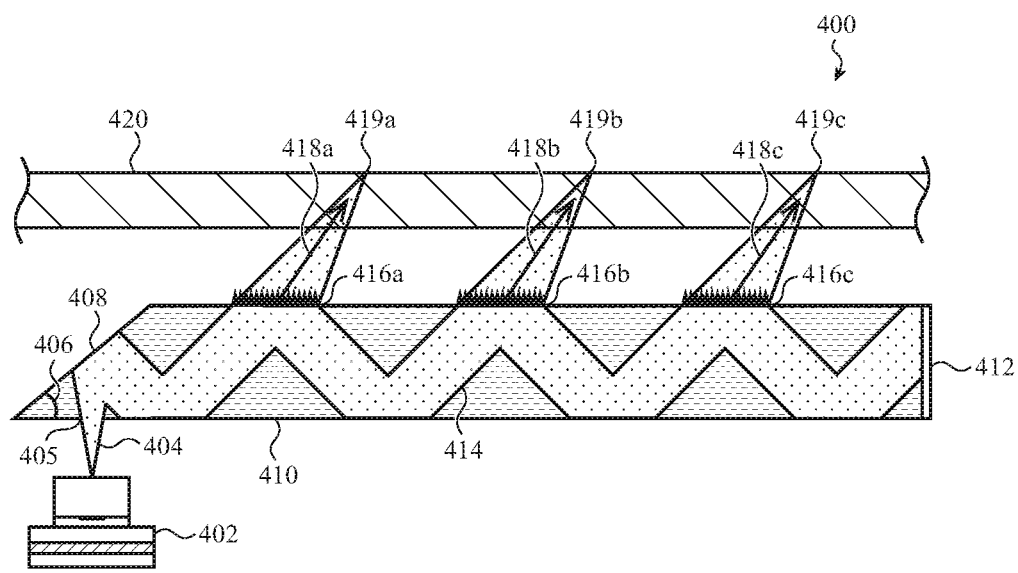
FIG. 4A illustrates a laser diode and an optical waveguide with transmissive light out-couplers configured to detect a user input to an input surface, according to an embodiment.

FIG. 4A shows a cross-sectional view of part of an electronic device 400. Toward the exterior of the electronic device is the input surface 420, as described above. The electronic device 400 also includes an optical waveguide 410 and laser light source 402. The laser light source 402 inserts light 404 into the optical waveguide 410 so that it undergoes total internal reflections through the optical waveguide 410 until reaching a reflector 412, which may be a full or partial reflector. The inserted light 404 then is reflected back through the optical waveguide 410 and may be received into the laser light source 402. The reflected light received back into the laser light source 402 may then undergo self-mixing, as described above, with the light present in the cavity of the laser light source 402. The self-mixing can produce a measurable change in an operational parameter of the laser light source 402. The optical waveguide 410 thus functions similarly to the optical feedback cavities 228 and 308 described previously.

The optical waveguide 410 also includes multiple transmissive light out-couplers 416a, 416b, and 416c, through which the inserted light 404 may be caused to exit the optical waveguide 410 as respective transmitted lights 418a, 418b, and 418c, as will be explained further below. Any of the transmitted lights 418a, 418b, and 418c can be modified or altered due to an user input on and/or in proximity to the input surface 420. For example, a user touch at the sensing location 419a on the input surface 420 can reflect or otherwise interfere with the transmitted light 418a. Such reflection or interference can alter the total light that is received back into the laser light source 402, and measurably affect or alter an operational parameter of the laser light source 402. Based on such a measured effect or value of operational parameter, associated processing electronics can detect that a force, touch or other user input has occurred, and determine, using frequency-based analysis, at which of the sensing locations 419a-c the user input occurred. This allows the single laser light source 402 to be used for detection of user inputs at multiple sensing locations. While three sensing locations are shown in FIG. 4A for simplicity of explanation, it will be clear that embodiments may have more light out-couplers and associated sensing locations. Further details of these components and operations will now be given.

The laser light source 402 may include a laser diode; which, in particular, may be a vertical cavity, surface emitting laser (VCSEL) diode. The laser light source 402 may optionally include a photodetector, either as an internal component, or as a separate component associated with a laser diode. Such a photodetector may measure and/or detect either the light internal to the laser diode's laser cavity, or detect reflections of light emitted by the laser diode. As used herein, a laser light source will refer to a source of laser light that may optionally, though not necessarily, include a photodetector. The laser light source may include associated electronics by which its operational parameters can be monitored and/or controlled.

Operational parameters of the laser light source 402 can be include a junction voltage or current in the laser diode, the bias voltage or current supplied to the laser diode, the power used, or another operational parameter. For laser light sources 402 that also have a photodetector, the operational parameter may be an output voltage and/or current of the photodetector, or a power thereof. Such operational parameters of the laser diode can be monitored or measured by associated processing electronics and/or processors to detect user inputs on the input surface 420. The processing electronics and/or processors can in turn modify the operation of the laser light source 402, such as by modifying a supply or bias voltage, current, or power.

Laser light emitted by the laser light source 402 can be directed to be an inserted light 404 that enters the optical waveguide 410 at an insertion location 405. Various configurations and methods for directing the laser light emitted by laser light source 402 to be the inserted light 404 will be described below, in particular in FIGS. 6A-B and 7. In the embodiment of FIG. 4A, the laser light is emitted mostly perpendicularly into the optical waveguide 410 at the insertion location 405. The optical waveguide 410 is configured at the insertion location 405 to direct the inserted light 404 into the optical waveguide 410 to undergo total internal reflection along the optical waveguide 410. In the configuration of FIG. 4A, the optical waveguide 410 has a diagonal end cut at angle 406 and a reflecting surface 408. In some embodiments, the optical waveguide 410 has an in-coupling prism to direct the inserted light 404 into the optical waveguide 410.

In some embodiments, the material of the optical waveguide 410 may be glass, plastic, or other suitable material. The angle 406 can be greater than the critical angle for the material of the optical waveguide 410. In various embodiments, the optical waveguide 410 may have a diameter or thickness ranging between 5 μm to 1 mm, though this is not a limitation. The smaller diameter values may better support single mode transmission of the waveguide light 414.

The inserted light 404 is directed to be the waveguide light 414 that proceeds along the optical waveguide 410 to a reflector 412. The reflector 412 may be fully or partially reflective. The waveguide light 414 then is reflected back toward the insertion location 405, where it may exit the optical waveguide 410 and be received by the laser light source 402. Such received reflections of the waveguide light 414 may either enter the laser cavity of the laser light source 402 to undergo self-mixing interference, or, in some embodiments, be detected by a photodetector.

The optical waveguide 410 shown in FIG. 4A has three transmissive light out-couplers 416a-c, though other embodiments may have more. These can be implemented as diffraction gratings spaced along the optical waveguide 410. The spacing of the transmissive light out-couplers 416a-c may be uniform along the optical waveguide 410, though this is not required.

Further details related to the operations of the embodiments described in relation to FIG. 4A will be given below.

Figure 4B:
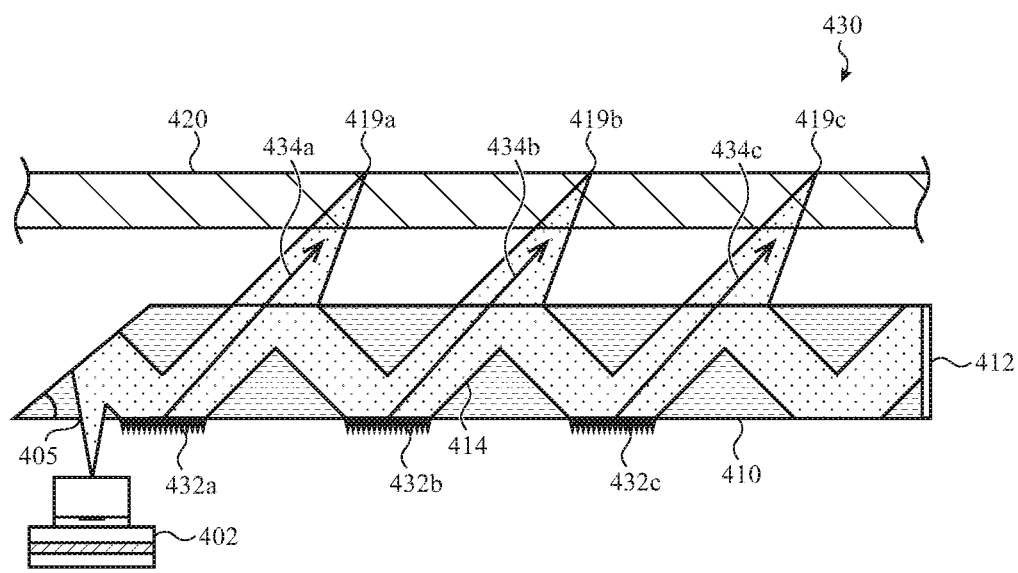
FIG. 4B illustrates a laser diode and an optical waveguide with reflective light out-couplers configured to detect a user input to an input surface, according to an embodiment.

FIG. 4B shows an embodiment of an electronic device 430 having a different implementation of light out-couplers. Similar to the embodiments of the electronic device 400 just described, the electronic device 430 includes an input surface 420, a laser light source 402, and an optical waveguide 410 having a reflector 412 at a distance away from the insertion location 405. These may be as described in relation to the electronic device 400. The laser light source inserts light into the optical waveguide 410 that becomes the waveguide light 414, as described above.

The embodiment of FIG. 4B includes three reflective light out-couplers 432a-c positioned along the optical waveguide 410, though other embodiments may use more such reflective light out-couplers. The reflective light out-couplers 432a-c operate to reflect portions of the waveguide light 414 to exit the optical waveguide 410 and to be respective transmitted lights 434a, 434b, and 434c. The respective transmitted lights 434a-c may be directed toward the respective sensing locations 419a-c on the input surface 420. In other details, the embodiment of FIG. 4B is similar the embodiment shown in FIG. 4A.

Figure 4C:
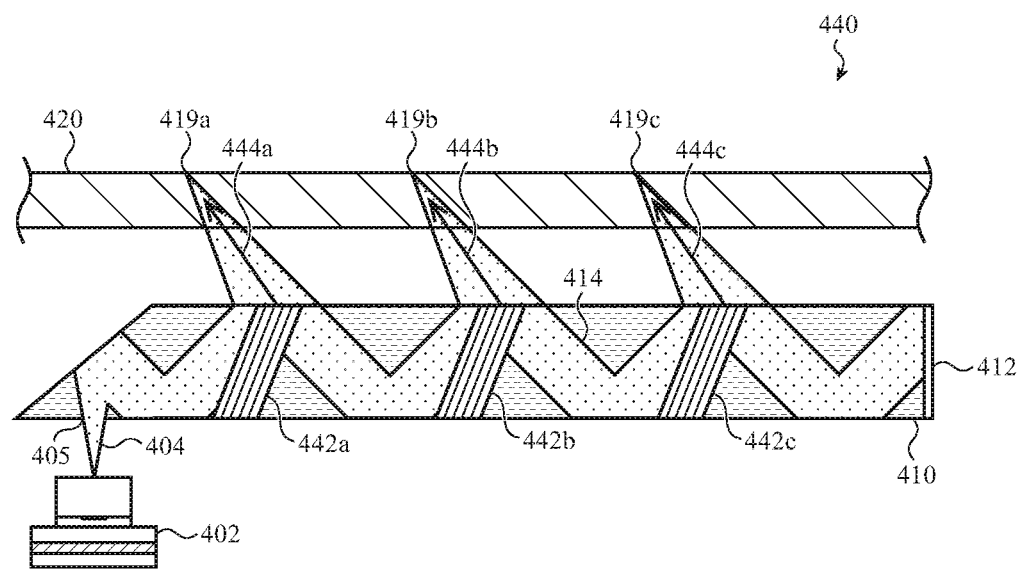
FIG. 4C illustrates a laser diode and an optical waveguide with in-waveguide tilted Bragg gratings for light out-couplers configured to detect input to an input surface, according to an embodiment.

FIG. 4C shows an embodiment of an electronic device 440 having a different implementation of light out-couplers. Similar to the embodiments of the electronic device 400 just described, the electronic device 440 includes an input surface 420, a laser light source 402, and an optical waveguide 410 having a reflector 412 at a distance away from the insertion location 405. These may be as described in relation to the electronic device 400. The laser light source 402 inserts light 404 into the optical waveguide 410 that becomes the waveguide light 414, as described above.

The embodiment of FIG. 4C includes three in-waveguide tilted Bragg gratings 442a, 442b, and 442c as light out-couplers positioned along the optical waveguide 410, though other embodiments may use more such light out-couplers. The in-waveguide tilted Bragg gratings 442a-c operate to transmit portions of the waveguide light 414 to exit the optical waveguide 410 and to be respective transmitted lights 444a, 444b, and 444c. The in-waveguide tilted Bragg gratings 442a-c may have a grating periodicity of approximately a half-wavelength (of the laser light's wavelength when moving within the waveguide). The respective transmitted lights 444a-c may be directed toward the respective sensing locations 419a-c on the input surface 420. In other details, the embodiment of FIG. 4C is similar the embodiment shown in FIG. 4A.

Figure 4D:
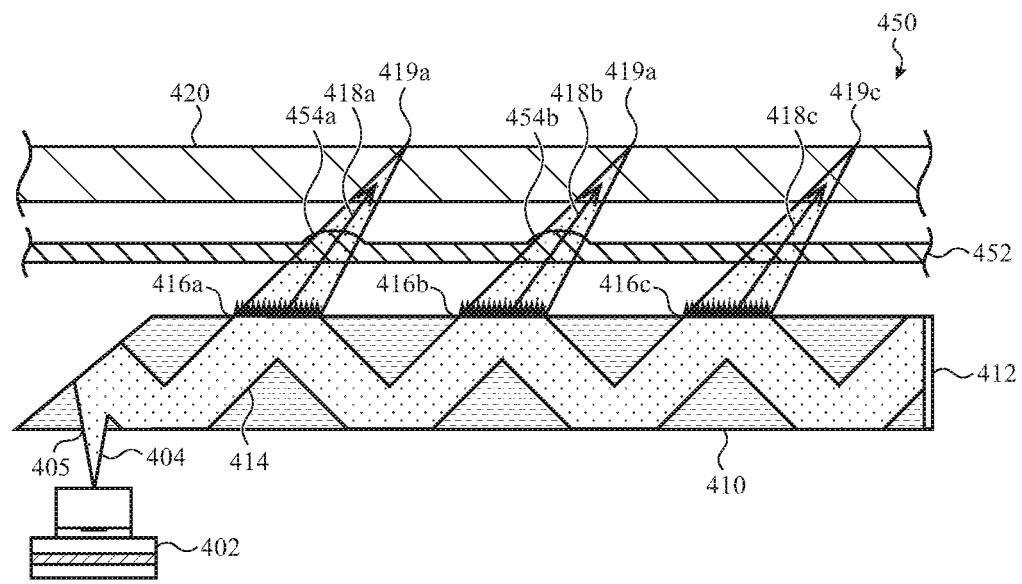
FIG. 4D illustrates a laser diode and an optical waveguide configured with a lens layer to detect user input to an input surface, according to an embodiment.

FIG. 4D shows an embodiment of an electronic device 450 that is a variation on the embodiments described in relation to FIG. 4A. The electronic device 450 includes a lens layer 452 positioned between the input surface 420 and the optical waveguide 410. The lens layer 452 may include one or more lenses, such as lenses 454a and 454b, that can respectively focus the transmitted lights 418a and 418b to the respective sensing locations 419a and 419b. In other embodiments, lenses may be used to shape the light to an optimal profile for the specific application.

FIGS. 5A-E show embodiments from another family of electronic devices that make use of a single laser light source and an optical waveguide for multi-point input detection. In the various embodiments of FIGS. 5A-D, the input surface is deformable and has a non-transmissive coating; in the embodiment of FIG. 5E the optical waveguide can serve as an input surface, without a separate input surface.

Figure 5A:
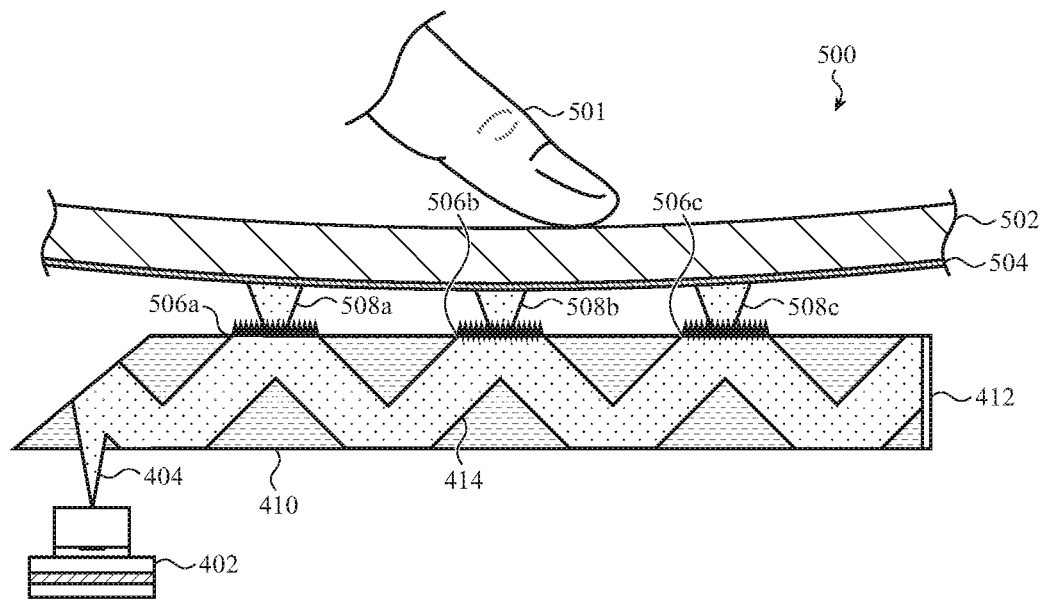
FIG. 5A illustrates a laser diode and an optical waveguide configured to detect user input to a deformable input surface, according to an embodiment.

FIG. 5A shows a cross-section view of an electronic device 500 that has a laser light source 402 that inserts light 404 into an optical waveguide 410. The inserted light 404 is directed to be the waveguide light 414, as described previously. The optical waveguide 410 in this embodiment also includes the reflector 412 positioned to reflect the waveguide light 414 back toward the laser light source 402. Similar to the embodiment of FIG. 4A, the optical waveguide 410 includes transmissive light out-couplers 506*a-c*, through which respective transmitted light 508*a-c* can exit the optical waveguide 410.

The electronic device 500 includes a deformable input surface 502 that may flex or bend upon a press or force input by a user's finger 501, a stylus or other device. The deformable input surface 502 may have a non-transmissive coating 504 positioned to reflect all or a portion of the transmitted lights 508*a-c*. These reflections can then reenter the optical waveguide 410 and be received at the laser light source 402. As such, the distance from the insertion location of the inserted light 404 to the non-transmissive coating 504 can function as an optical feedback cavity, such as optical feedback cavities 228 and 308 described respectively in FIGS. 2B and 3A. A press or force input by the user's finger 501 can alter this distance due to flexing of the deformable input surface 502.

Figure 5B:
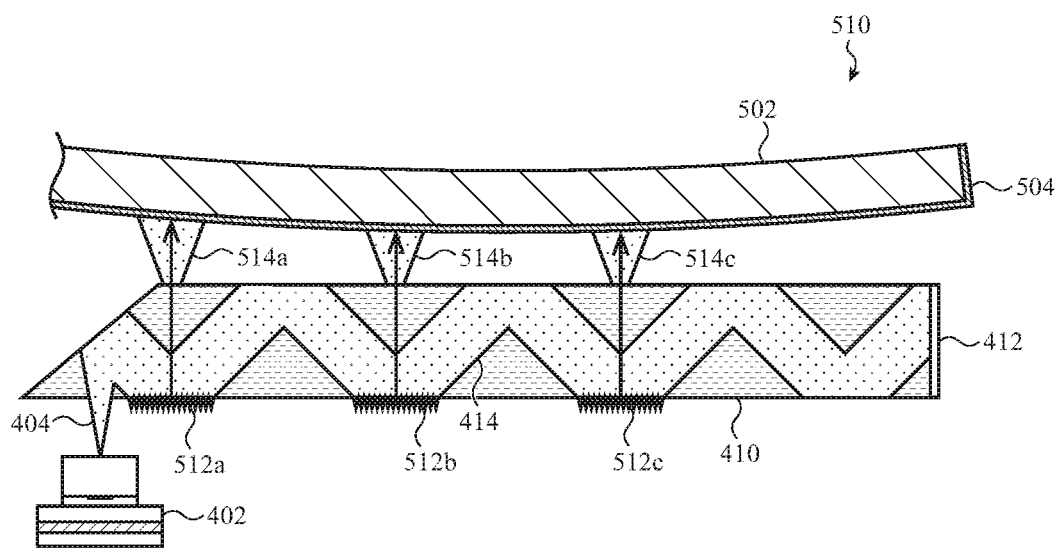
FIG. 5B illustrates a laser diode and an optical waveguide configured to detect user input to a deformable input surface, according to an embodiment.

FIG. 5B shows a cross-section view of an electronic device 510 having a deformable input surface 502 with a non-transmissive coating 504 as described in relation to FIG. 5A. Also similar to the embodiment of FIG. 5A, the electronic device 510 includes a laser light source 402 configured to insert light 404 into the optical waveguide 410 that is then directed to become the waveguide light 414.

The optical waveguide 410 of electronic device 510 includes reflective light out-couplers 512*a-c*, similar to the reflective light out-couplers of FIG. 4B. The reflective light out-couplers 512*a-c* can each reflect a portion of the waveguide light 414 to exit the optical waveguide 410 to become the transmitted light 514*a-c*. These transmissions can be reflected by the non-transmissive coating 504. As described in relation to FIG. 5A, these reflections can then reenter the optical waveguide 410 and be received at the laser light source 402 so that the distance from the insertion location of the inserted light 404 to the non-transmissive coating 504 can function as an optical feedback cavity.

Figure 5C:
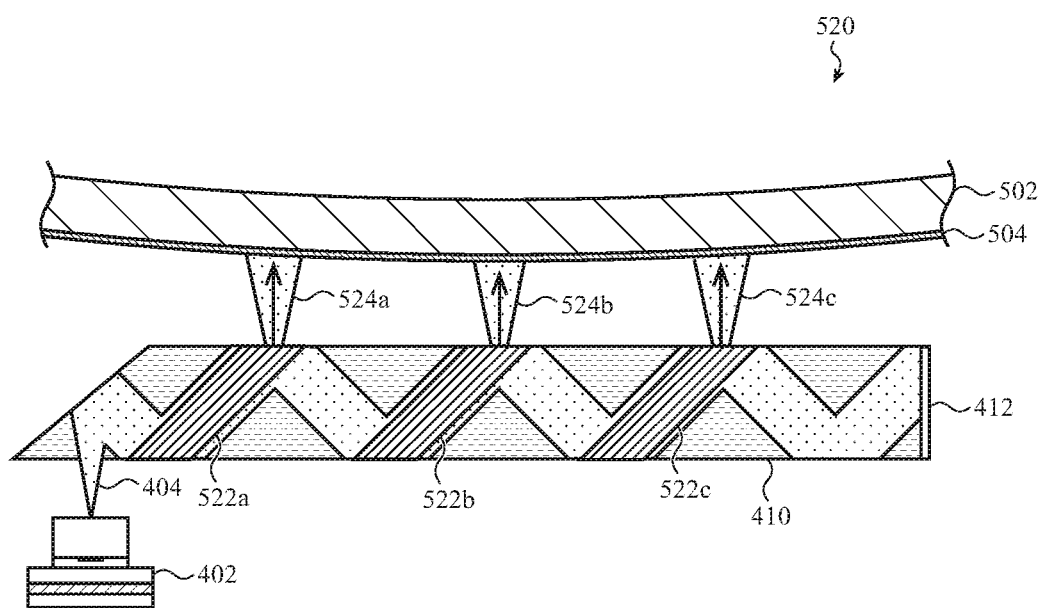
FIG. 5C illustrates a laser diode and an optical waveguide configured to detect user input to a deformable input surface, according to an embodiment.

FIG. 5C shows a cross-section view of an electronic device 520 having a deformable input surface 502 with a non-transmissive coating 504 as described in relation to FIG. 5A. The electronic device 520 similarly includes a laser light source 402 configured to insert light 404 into an optical waveguide 410. The optical waveguide 410 may have a reflector 412.

The electronic device 520 of FIG. 5C includes in-waveguide tilted Bragg gratings 522*a-c* that can direct respective portions of the waveguide light to exit the optical waveguide 410 to be the transmitted light 524*a-c*. As described in relation to FIG. 5A, these reflections can then reenter the optical waveguide 410 and be received at the laser light source 402 so that the distance from the insertion location of the inserted light 404 to the non-transmissive coating 504 can function as an optical feedback cavity. Press or force inputs on the deformable input surface 502 can alter this distance, and the alteration can induce a change in an operational parameter of the laser light source 402. The change in the operational parameter may be detected by associated processing electronics or a processor, and used to infer the location of the force input on the deformable input surface 502.

Figure 5D:
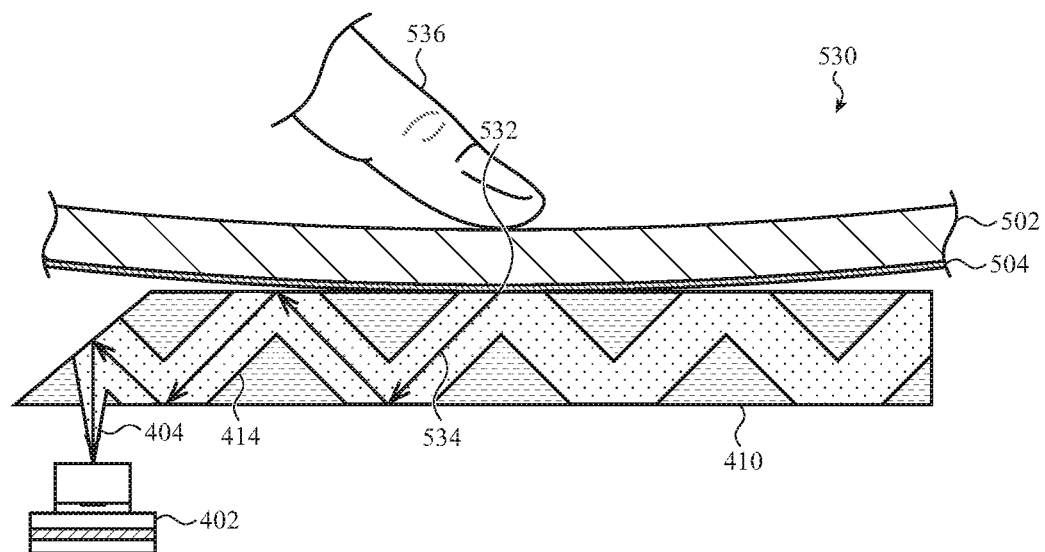
FIG. 5D illustrates a laser diode and an optical waveguide configured to detect user input to a deformable input surface, according to an embodiment.

FIG. 5D shows a cross-section of an electronic device 530 having a deformable input surface 502 with a non-transmissive coating 504 as described in relation to FIG. 5A. The electronic device 530 similarly includes a laser light source 402 configured to insert light 404 into optical waveguide 410. The inserted light 404 may be directed to be the waveguide light 414.

Operationally, a press of force by a user's finger 536 (or other pressing mechanism) may deflect the deformable input surface 502 sufficiently to contact the optical waveguide 410 at sensing location 532. The contact may cause a local refractive index change within the range of the evanescent field of the waveguide light 414. The local refractive index change within this range can cause an impedance mismatch that induces a back-reflection 534 of the waveguide light 414. The back-reflection 534 can be transmitted back through the optical waveguide 410 and received into the laser light source 402. Reception of the back-reflection 534 by the laser light source 402 may cause a change in an operational parameter of the laser light source 402 that can be detected, and from which the distance from the insertion location of the inserted light 404 to the sensing location 532 can be determined.

Figure 5E:
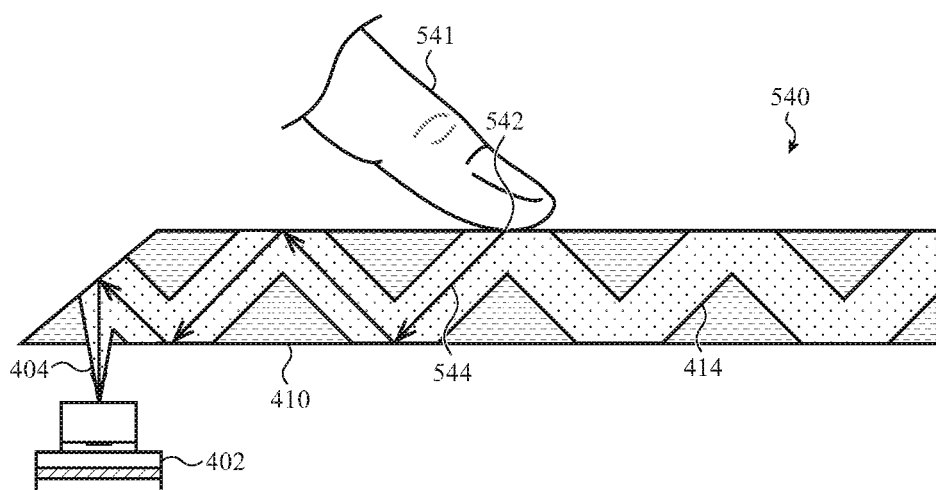
FIG. 5E illustrates a laser diode and an optical waveguide configured to detect user input to a deformable input surface, according to an embodiment.

FIG. 5E shows a cross-section of an electronic device 540 in which an optical waveguide 410 is configured as part of an input surface of the electronic device 540. In this configuration the user's finger 541 (or other input or press mechanism) can directly apply a press, touch or force to the optical waveguide 410. As in the embodiments of FIGS. 4A-5D, the electronic device 540 includes a laser light source 402 configured to insert light 404 into the optical waveguide 410, with the inserted light 404 being directed as the waveguide light 414.

A touch or press of a user's finger 541 at sensing location 542 of the electronic device 540 can cause a back-scatter 544 of at least a portion of the waveguide light 414 by frustrated total internal reflection and scattering of light from the skin. The back-scatter 544 can be transmitted back through the optical waveguide 410 and received into the laser light source 402. Reception of the back-scatter 544 by the laser light source 402 may cause a change in an operational parameter of the laser light source 402 that can be detected, and from which the distance from the insertion location of the inserted light 404 to the sensing location 542 can be determined.

Figure 6A:
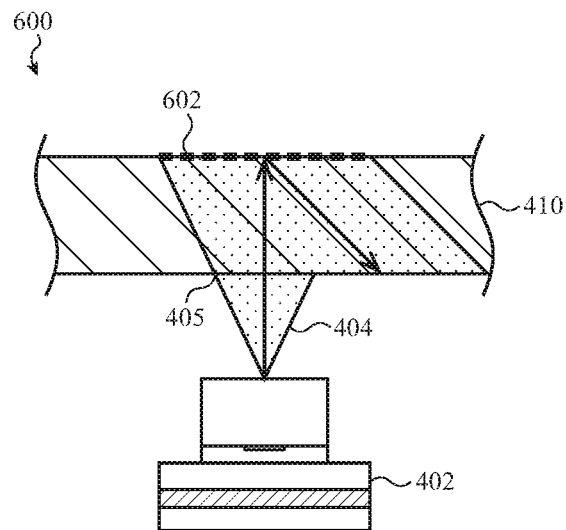
FIG. 6A illustrates a laser diode and a reflective light in-coupling element of an optical waveguide, according to an embodiment.
Figure 6B:
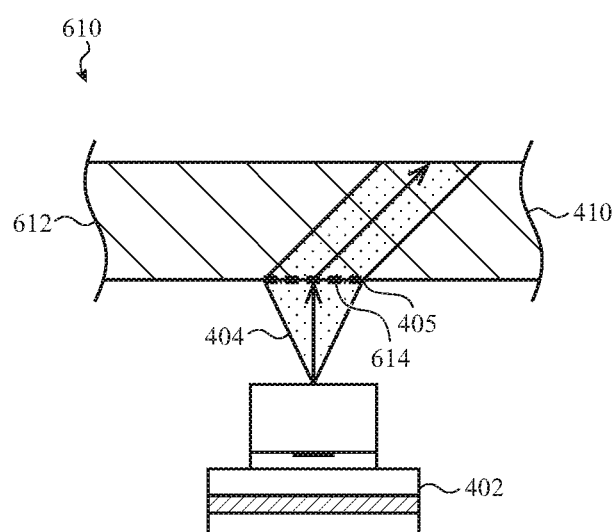
FIG. 6B illustrates a laser diode and a transmissive light in-coupling element of an optical waveguide, according to an embodiment.

Previously, the descriptions related to the embodiment in FIG. 4A gave a description of a first mechanism and method of inserting laser light emitted by a laser light source into an optical waveguide, i.e., the reflecting surface 408 or a prism positioned above the insertion location 405. However, other mechanisms and methods may be implemented, as will now be described. FIGS. 6A-B show alternate devices and mechanisms by which a laser light source's emitted laser light can be inserted into an optical waveguide.

FIG. 6A shows a partial cross-section of an electronic device 600 having an optical waveguide 410 into which a laser light source 402 is inserting a laser light 404 at insertion location 405. The inserted light 404 is inserted perpendicularly into the optical waveguide 410 from the laser light source 402. Part of the optical waveguide 410 is a reflective light in-coupling element 602. The reflective light in-coupling element 602 can redirect the inserted light 404 in a single direction along the length of the optical waveguide 410.

FIG. 6B shows a partial cross-section of an electronic device 610 having an optical waveguide 410 into which a laser light source 402 is inserting a laser light 404 at insertion location 405. In this embodiment, the optical waveguide 410 includes a transmissive light in-coupling element 614. The inserted light 404 may be directed perpendicularly to the optical waveguide 410 at the insertion location 405. The inserted light 404 is then redirected by the transmissive light in-coupling element 614 in a single direction into the optical waveguide 410.

In additional and/or alternative embodiments, the laser light sources described above, and the laser light sources to be described below, may include a collimating lens positioned between a point of exit of the laser light from the laser light source and the insertion location of the laser light into the optical waveguide. Such a collimating lens can cause the inserted light to have a narrow range of angles, which can decrease modal dispersion of the waveguide light.

Figure 7:
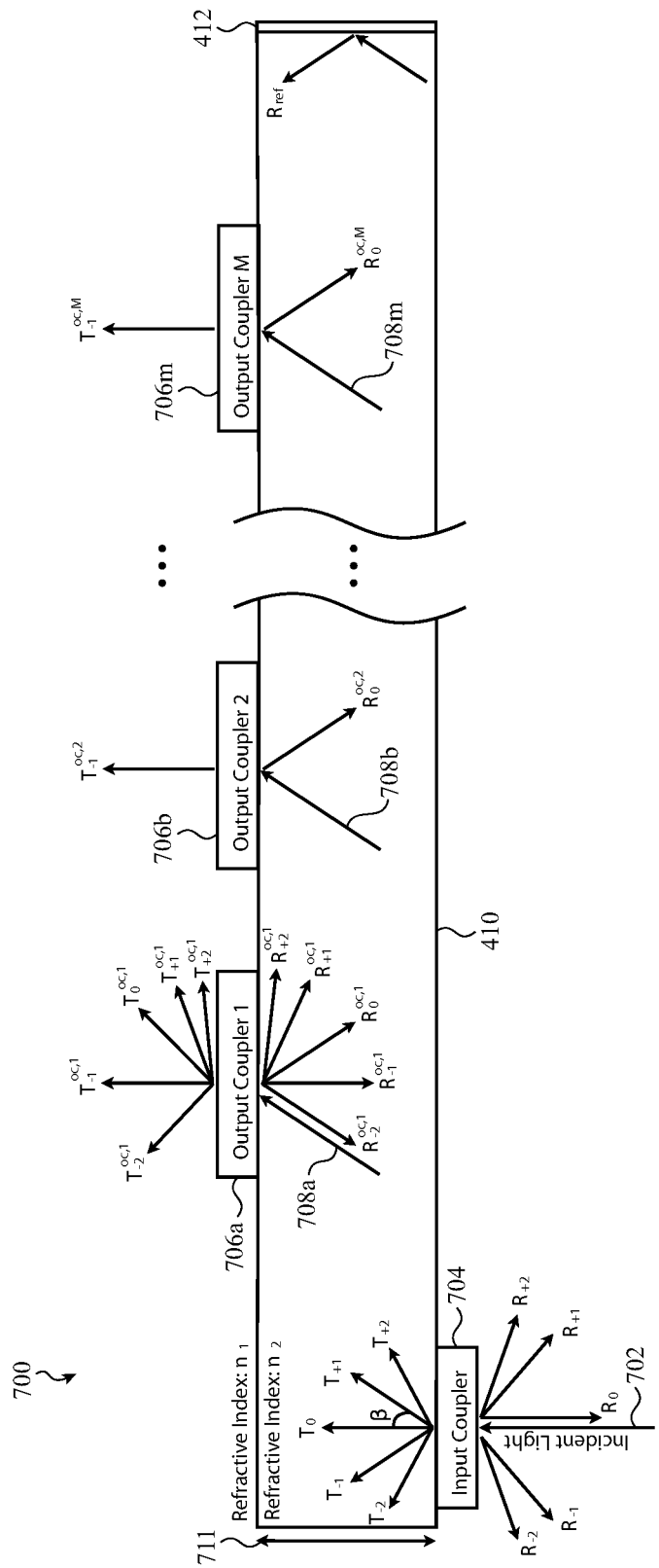
FIG. 7 illustrates reflection and transmission parameters in an optical waveguide, according to an embodiment.

FIG. 7 illustrates further details, design considerations, and embodiments related to the light in-coupling elements and light out-couplers discussed above. FIG. 7 shows a cross-section 700 of an optical waveguide 410 into which an incident laser light 702, such as from a laser light source, is being inserted at the light in-coupling element 704 (labeled as Input Coupler for brevity). The optical waveguide 410 includes a light guiding material of refractive index $n_2$. The exterior material surrounding the light guiding material of the optical waveguide 410, such as an exterior cladding, air, vacuum, or another material, has refractive index $n_1$. The light guiding material of the optical waveguide 410 has a thickness 711. The thickness 711 may be many times or comparable to the wavelength of the incident laser light 702. Positioned along the optical waveguide 410 are M many light out-couplers 706a-m. The light out-couplers 706a-m may be spaced regularly along the optical waveguide 410. At a location along the optical waveguide 410 past the light out-couplers 706a-m is reflector 412 with a reflection coefficient $R_{ref}$.

Generally and with respect to the light in-coupling element 704, is that all or most of the incident laser light 702 is inserted into optical waveguide 410, i.e., there is little to no power in the various reflected components—$R_{-3}$, $R_{-2}$, $R_{-1}$, $R_0$, $R_{+1}$, $R_{+2}$, $R_{+3}$, ..., —of the incident laser light 702 from the light in-coupling element 704. In the case that the incident laser light 702 is inserted into the optical waveguide 410 and reflects off an internal reflector, such as reflecting surface 408 described in relation to the embodiment of FIG. 4A, such almost complete insertion of the incident light typically occurs.

In embodiments that use a grating for the light in-coupling element 704, the power in the incident laser light 702 is directed by the grating of the light in-coupling element 704 into the depicted transmission channel diffraction order $T_{+1}$, with, ideally, $T_n=0$ for all n except +1. For the diffraction order $T_{+1}$ to be guided within the optical waveguide 410, the angle β should be taken greater than the critical angle: $\theta_{crit}=\sin^{-1}(n_1/n_2)$. This in turn implies the periodicity of the grating in the light in-coupling element 704 should be less than the wavelength of the incident laser light 702.

The inserted light, indicated by initial light ray 708a, is to undergo total internal reflection, except where the light out-couplers 706a-m transmit light beams from the optical waveguide 410. This implies for each of the light out-couplers 706a-m that the reflection coefficients satisfy $R_n^{oc,m}=0$ for all n except 0, and that the transmission coefficients of the transmitted light beams satisfy $T_n^{oc,m}=0$ for all n except −1. Further, there is to be little or no absorption loss, i.e., that $R_0^{oc,m}=1-T_{-1}^{oc,n}$.

For the methods of location detection described below, the feedback strength from each transmitted light beam from the light out-couplers 706a-m is to be equal or nearly so. This implies, for m the index of the out-couplers ranging from 1 to M:

$$T_{-1}^{oc,m} = \frac{T_{-1}^{oc,1}}{1-(m-1)T_{-1}^{oc,1}}$$

Also, the feedback strength from the reflector 412 (i.e., the power in the waveguide light that is reflected back to the laser light source) is to be equal to the strength of the feedback strength from each transmitted light beams from the light out-couplers 706a-m. This implies $(T_{-1}^{oc,1})^2=R_{ref}(1-MT_{-1}^{oc,1})^2$, for M the largest index of the light out-couplers 706a-m.

Figure 8:
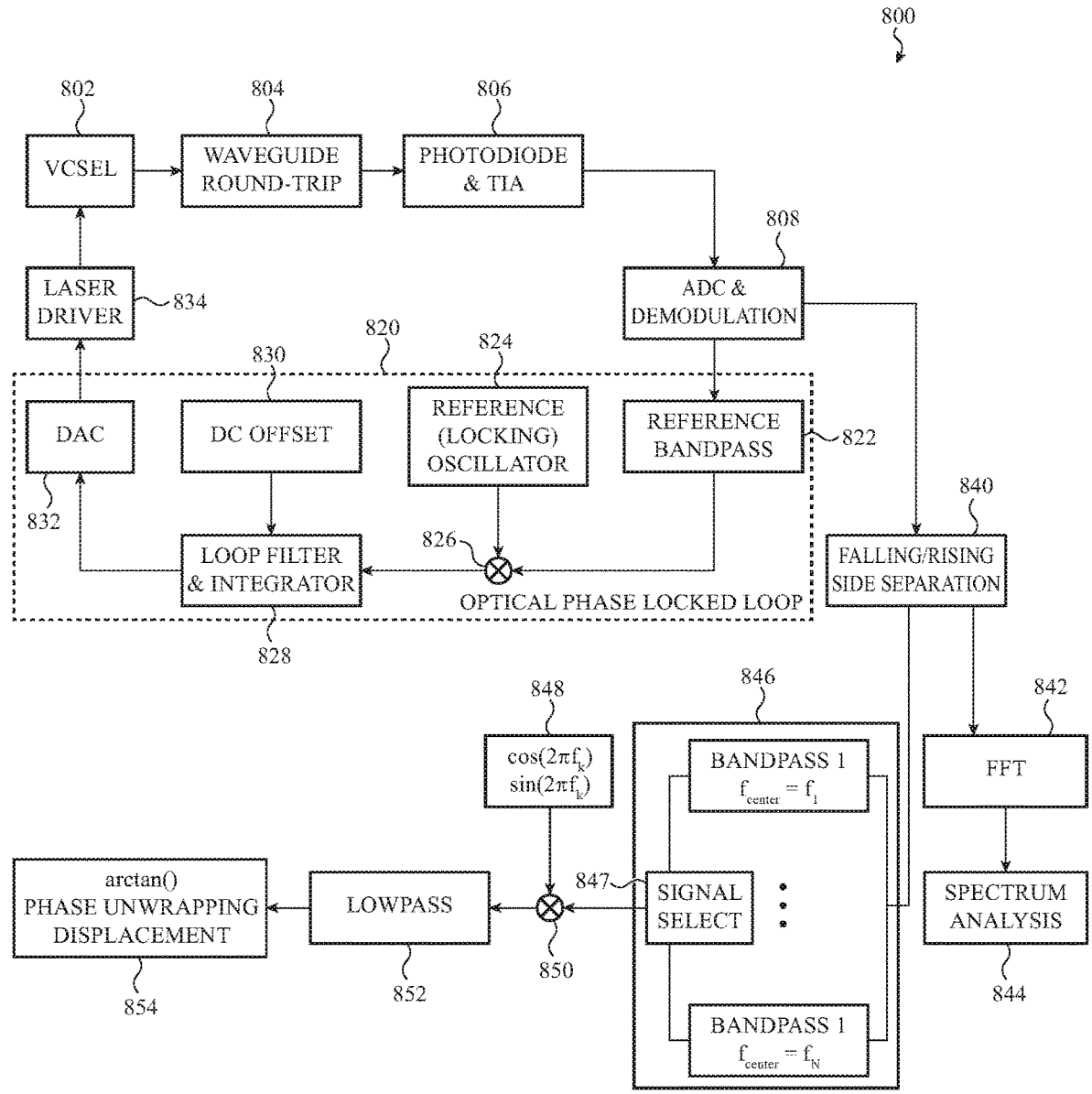
FIG. 8 shows a block diagram of a system for user input detection that uses a laser diode, optical waveguide, and a phase locked looped, according to an embodiment.

FIG. 8 shows a block diagram of a system 800 that may be used to detect at least one of a location, magnitude, velocity, or another aspect of a user input on an input surface. The system 800 may include at least one laser light source 802 in combination with an optical waveguide, such as any of the combinations described above. The system 800 may also include processing electronics to control operation of a laser light source and receive measurements of those operational parameters. The system 800 can include an optical phase locked loop 820 that can operate in conjunction with the other components of the processing electronics to control the wavelength of the laser light emitted by the laser light source 802. The system 800 also includes components to perform a spectrum analysis on one or more operational parameters of the laser light source, which may be operational parameters of: a laser diode of the laser light source, of a photodiode within the laser light source, or of a photodiode external to the laser light source. The spectrum analysis results may be used to infer at least one of a location, magnitude, velocity, or another aspect of a user input on an input surface.

The system 800 includes the laser light source 802, which may use a VCSEL diode to emit laser light for insertion into an optical waveguide 804. The inserted light can be received back into the laser light source after a reflection and may undergo self-mixing in the laser cavity. The self-mixing can affect an operational parameter of the laser diode, as explained above, with the effect being measurable. Additionally and/or alternatively, the laser light source 802 may use a photodetector 806 to detect properties of the reflected light or of the laser cavity light. The photodetector 806 may include a photodiode for detecting or measuring the light, and may include a transimpedance amplifier (TIA) to amplify and/or buffer a signal of the photodiode. In some embodiments, the TIA may be a separate component from the photodetector 806.

The signal from the photodetector 806 may then be sampled and converted to digital values at the analog-to-digital converter (ADC) 808. The digital values can then be demodulated as needed in order to isolate the self-mixing interference related portion of the signal. The laser driver 834 can impose a specific waveform onto the emitted laser power to control the emitted laser wavelength to have a specific respective waveform. Demodulation can remove the imposed specific waveform and any other underlying waveform that does not originate from self-mixing interference. Thus, after demodulation, the signal that remains is mostly or only the self-mixing interference portion.

The laser driver 834 of the system 800 can provide control of the wavelength of laser light emitted by the laser light source 802. The wavelength control can be enabled by control of a junction voltage, a bias current, a power supplied, or other operations applied to a laser diode within the laser light source 802. The laser driver 834 may also provide other control operations for the laser light source, such on/off signaling and/or temperature control.

The system 800 can include an optical phase locked loop (OPLL) 820 that can work in conjunction with the laser driver 834 to control operation of the laser light source 802.

The OPLL 820 can receive the digital signals from the ADC 808. Further details on the operation of the OPLL 820 are given below.

The system 800 can include components for performing a spectrum analysis on the signal from the ADC 808. These components include a timing and separation component 840 that can separate the sections of the output signal from the ADC 808 that correspond to time intervals during which the wavelength of laser light from the laser light source 802 was increasing, and the sections of the output signal that correspond to time intervals during which the wavelength of laser light from the laser light source 802 was decreasing. As will be explained below, when the system 800 operates to detect an absolute distance of a reflected light from a light out-coupler, the laser light source is controlled to emit a laser light having a wavelength that varies according to ramp function (also known as a triangle function), i.e., a function that linearly increases during a first time interval and then linearly decreases during a following second time interval. The ramp function can periodically repeat. In some embodiments, the durations of the first and second time intervals are equal, with the respective slopes of each linear section being equal in magnitude but of opposite sign, though this is not required. The timing and separation component 840 can either receive a timing signal, such as a clock signal, that specifies the respective intervals, or may be the source of such a timing signal. As a result, over a full period of the ramp function, the timing and separation component 840 provides a rising signal containing digital samples taken during the first time interval, and a falling signal containing the digital samples taken during the second time interval. Note that rising and falling signals contain digital values of an operational parameter of the laser light source.

The spectrum analysis components can include Fourier transform block 842 that applies a separate Fourier transform, such as by a Fast Fourier Transform (FFT), to each of the rising signal and the falling signal. The spectrum analysis can provide magnitude and phase values as a function of frequency. The peaks in the magnitude (also termed the spectral peaks) can correlate with locations along the waveguide of light out-couplers, which in turn can be associated with (or positioned adjacent to) sensing locations on an input surface. There can also be a spectral peak correlated with the reflector, such as reflector 412 in FIG. 4A. The spectral peak correlated with the reflector can be at the highest frequency, as the reflector is located at a greater distance along the waveguide from a light insertion location than the waveguide's light out-couplers.

Variations in the spectral peaks, such as magnitude or center frequency, may be used to infer at which sensing location there is a user press, touch, force, or other input. This inference can be made at the spectrum analysis block 844.

Further components of the spectrum analysis section of system 800 can include components for heterodyning either or both of the rising and the falling signals. These components include the filter bank 846 that performs respective bandpass filterings. Each bandpass filter in the filter bank 846 has a respective center frequency at the spectral peaks that correlate or correspond with locations along the waveguide of light out-couplers. In the example shown, BANDPASS N may be associated with the location of the last light out-coupler along the waveguide before the reflector. A signal selector 847 can select a particular bandpass output signal for subsequent processing. Alternatively, all or some of the bandpass output signals from the filter bank 846 may be selected for processing in parallel. Each of the bandpass output signals from the filter bank 846 is multiplied by a respective cosine and sine signal from the frequency generator block 848 at the multiplier block 850. The respective cosine and sine signals have a respective frequency corresponding to the center frequency of the respective bandpass filter. Each center frequency is related to the distance of a location of a respective light out-coupler along the waveguide. The low pass filter 852 separates a low frequency component of the multiplied signal, to which is applied phase unwrapping 854. From this a displacement of the input surface at the sensing location associated with the last light out-coupler may be inferred.

The OPLL 820 can be operated to provide feedback control to the laser driver 834 in order that the laser light source 802 emits a laser light whose wavelength has the linear ramp function described above. To emit a laser light with such a property, an input signal to the laser light source, such as a bias current or supply voltage applied to the laser diode, may need to be varied with an input signal that is not a linear ramp.

The OPLL can provide the needed feedback by receiving the output signal of the ADC 808 and applying a reference bandpass filter 822 to that output signal. The reference bandpass filter 822 can have a frequency passband containing the spectral peak corresponding to a reflector in the waveguide. The reflector in the waveguide can be at a specifically known distance along the waveguide and so can be associated with a known spectral peak at a known frequency.

The output of the reference bandpass filter 822 is then heterodyned by being multiplied, at multiplication block 826, by at least sinusoid generated by the reference frequency oscillator 824. The reference frequency oscillator 824 can be set at or close to the known frequency of the spectral peak corresponding to the reflector in the waveguide. Thereafter, a loop filter and integrator 828 generates the waveform required to obtain the linear ramp wavelength modulation, and adds a direct current (DC) offset that is above the lasing threshold of the VCSEL 802.

The output of the loop filter and integrator 828 then is used as an input to the digital-to-analog converter (DAC) 832. The analog output of the DAC 832 then is used as input by the laser driver 834. The feedback provided by the OPLL 820 thus acts to control the wavelength of the laser light emitted by the laser light source to follow a linear ramp waveform.

The system 800 is one structure for providing control of the wavelength emitted by a laser diode of a laser light source. Other systems and structures may also be used. For example, in another embodiment, a pre-distorted waveform is used to obtain the required wavelength control.

Figure 9C:
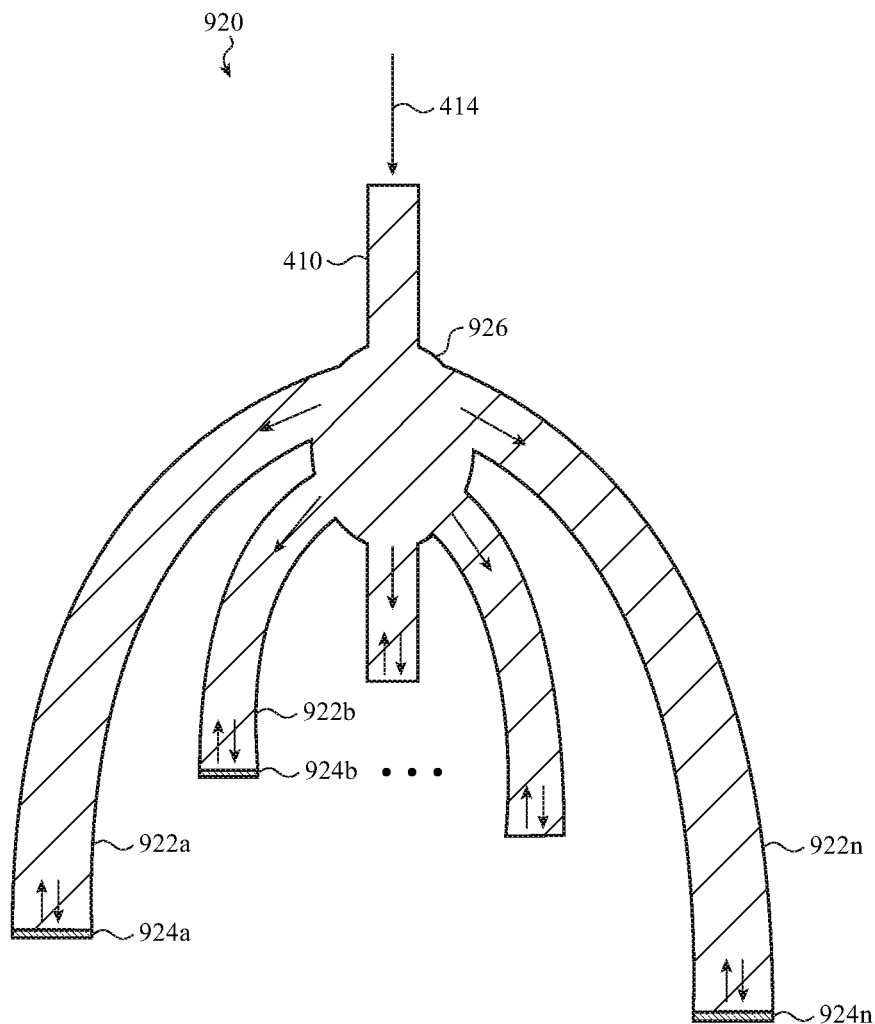
FIG. 9C shows a top view of a parallel configuration for an optical waveguide as it can be positioned with respect to an input surface for detecting user inputs, according to an embodiment.

FIGS. 9A-C show geometrical layout configurations for the optical waveguides to enable input location detection and input force measurement on an input surface.

FIG. 9A shows a top view of a serial configuration 900 for an optical waveguide 410 with waveguide light 414. The optical waveguide 410 includes light out-couplers 902a-n arranged serially along the optical waveguide 410 and a reflector 904, such as the reflector 412 described with respect to FIG. 4A. Each of the light out-couplers 902a-n can operate to direct a portion (i.e., some or all) of the waveguide light 414 from the optical waveguide 410, and to receive reflected some or all of such light directed out of the optical waveguide. Such reflections can be caused by a user's finger. Or a user's press or touch can cause the light out-couplers 902a-n themselves to reflect the waveguide light 414.

The serial configuration 900 may be placed linearly along a narrow input surface, such as the side 102 of FIG. 1A, to detect a user's one-dimensional scroll or slide movement, or to detect a localized input at any one of the sensing locations 106a-n. In other embodiments, to detect locations of user input across an input surface having two-dimensional extent, such as on the two-dimensional display surface 122 of the electronic device 120 of FIG. 1B, the serial configuration 900 may be formed as U-shape, S-shape, or another shape. With a U-shape, the serial configuration 900 can be positioned so its light out-couplers 902a-n can be placed in proximity to all of the sensing locations 124a-n and the sensing locations in a parallel column of sensing locations.

In still further embodiments, more than one serial configuration 900, each with a single laser light source, can be placed in parallel columns across a two-dimensional input surface. Other arrangements of multiple serial configurations 900 may be used on a two-dimensional input surface.

FIG. 9B shows a top view of a quasi-serial configuration 910 for an optical waveguide 410 with waveguide light 414. The optical waveguide 410 includes light out-couplers 912a-n arranged serially along the optical waveguide 410 and a reflector 904, such as the reflector 412 described with respect to FIG. 4A. The light out-couplers 912a-n can be one of a waveguide-to-air interface, a reflective coating, a transmissive coating, or a diffraction grating. Similarly, the reflector 904 may also be one of a waveguide-to-air interface, a reflective coating, a transmissive coating, or a diffraction grating.

Similar to the serial configuration 900, the quasi-serial configuration 910 may be placed in a linear configuration along a narrow input surface, such as the side 102 of FIG. 1A, to detect a user's one-dimensional scroll or slide movement or to detect a localized input at any one of the sensing locations 106a-n. In other embodiments, to detect locations of user input across an input surface having a two-dimensional extent, such as on the two-dimensional display surface 122 of the electronic device 120 of FIG. 1B, the quasi-serial configuration 910 may be formed as U-shape, S-shape, or another shape. With a U-shape, the quasi-serial configuration 910 can be positioned so its light out-couplers 912a-n can be placed in proximity to all of the sensing locations 124a-n and the sensing locations in a parallel column of sensing locations. In still further embodiments, more than one quasi-serial configuration 910, each with a single laser light source, can be placed in parallel columns across a two-dimensional input surface. Other arrangements of multiple quasi-serial configurations 910 may be used on a two-dimensional input surface.

FIG. 9C shows a top view of a parallel configuration 920 for an optical waveguide 410 with waveguide light 414. The optical waveguide 410 is formed with multiple branch optical waveguides 922a-n arising from a light coupler 926. At the ends of the branch optical waveguides 922a-n can be respective light out-couplers 924a-n. The branch optical waveguides 922a-n may have different lengths, analogous to the different lengths of the light out-couplers 902a-n from the insertion location in the serial configuration 900. This allows the light out-couplers 924a-n can be individually detected by the methods described above.

The longest of the branch optical waveguides 922a-n may serve in the role of a reference reflector, such as reflector 904 of the serial and quasi-serial configurations described above. In the example shown in FIG. 9C, the light out-coupler 924n serves this role.

Multiple parallel configurations 920 may be used with a single input surface. The branch light out-couplers in that case may be interleaved. Interleaving can allow for redundancy in case of failure of one of the parallel configurations. For example, if two branch optical waveguides, each from a different parallel configuration, were such that their light out-couplers were next to adjacent sensing locations on the input surface, a first of the parallel configuration would still be able to provide partial location detection in the event of failure of the second parallel configuration.

III. Hybrid Devices, Systems, and Methods

The devices, systems and methods described in section II make use of measured operational parameters of a laser light source to infer locations and/or motions of a user input on an input surface of an electronic device. The embodiments to be disclosed in this section make use of pressure applied to the surface as well as such measured operational parameters of the laser light source. The applied pressure on the input surface may be transferred from the input surface to an internal layer, which can be an optical waveguide into which laser light has been inserted, or an additional optical waveguide. The transferred applied pressure can alter a property of the inserted light, which can induce a change in an operational parameter of the laser light source that is detected and/or measured by a processor or processing electronics.

Figure 10A:
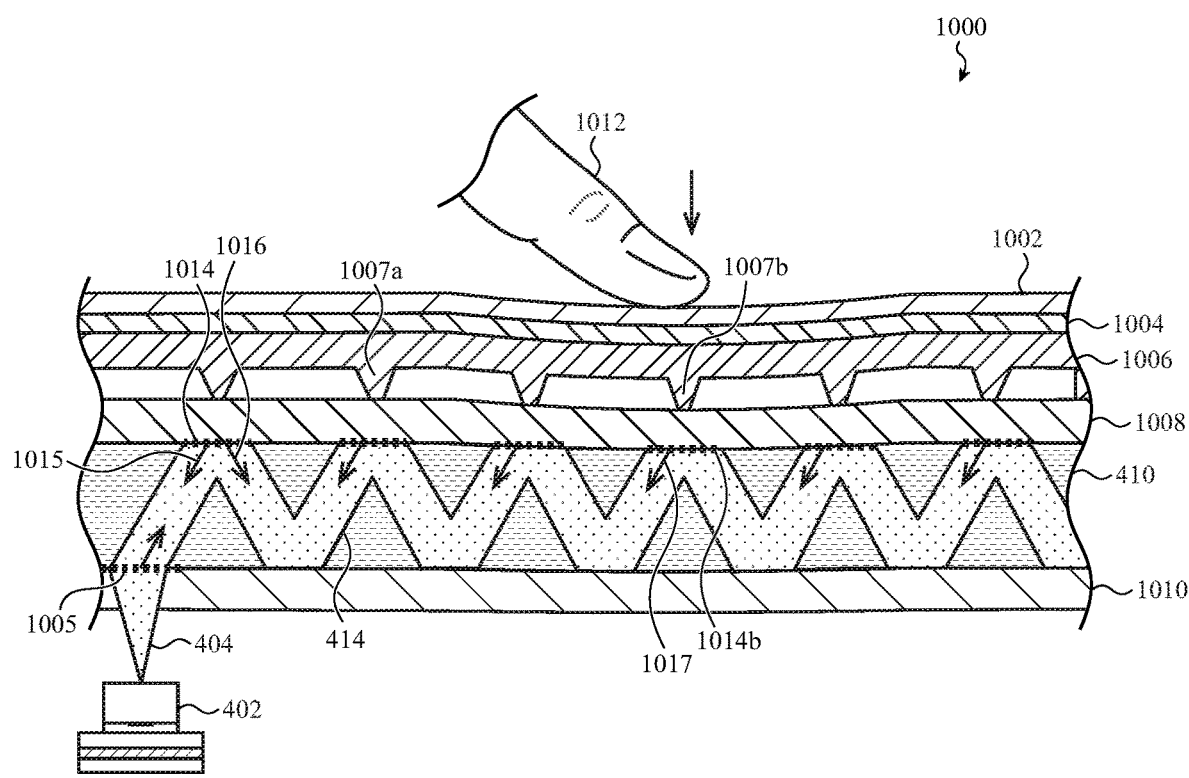
FIG. 10A shows a laser diode and a single optical waveguide configured to detect user input to a deformable input surface by transfer of pressure through a soft layer, according to an embodiment.
Figure 10B:
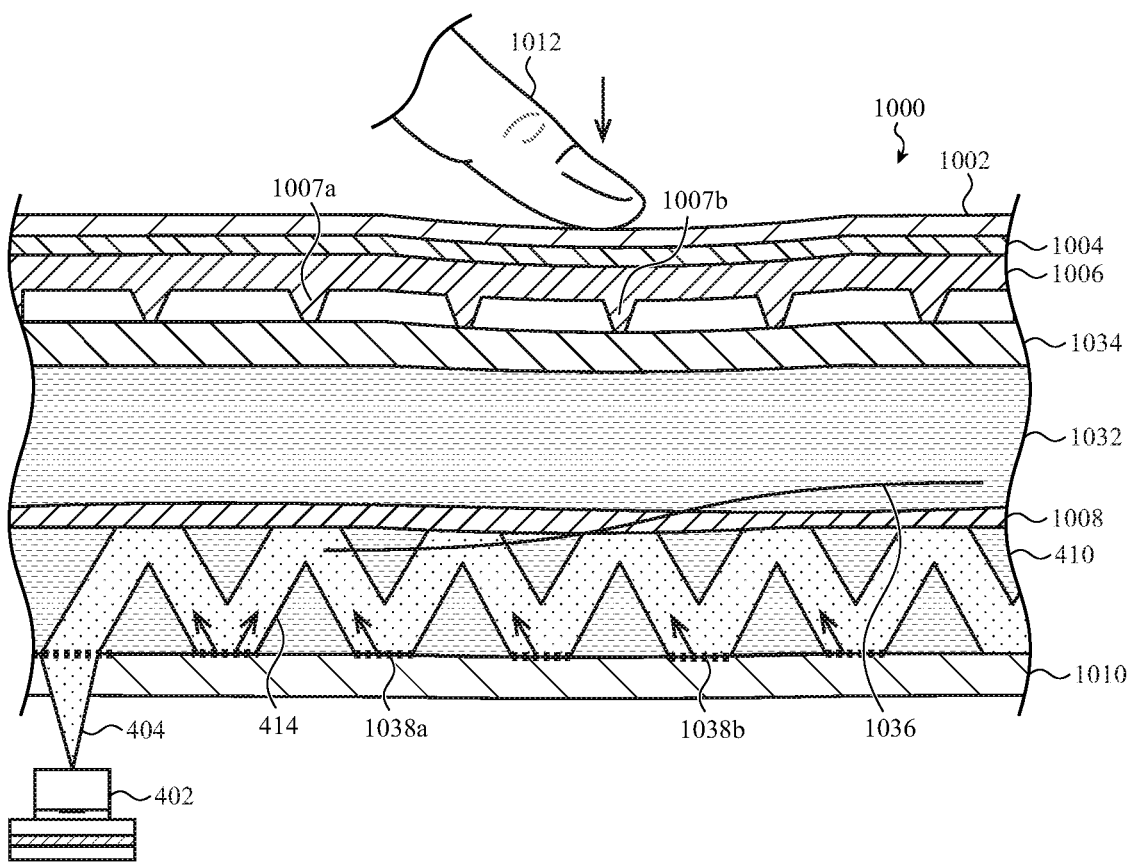
FIG. 10B shows a laser diode, a first optical waveguide, and a second optical waveguide configured to detect user input to a deformable input surface by light leakage from the second optical waveguide into the first optical waveguide through a soft layer, according to an embodiment.
Figure 10C:
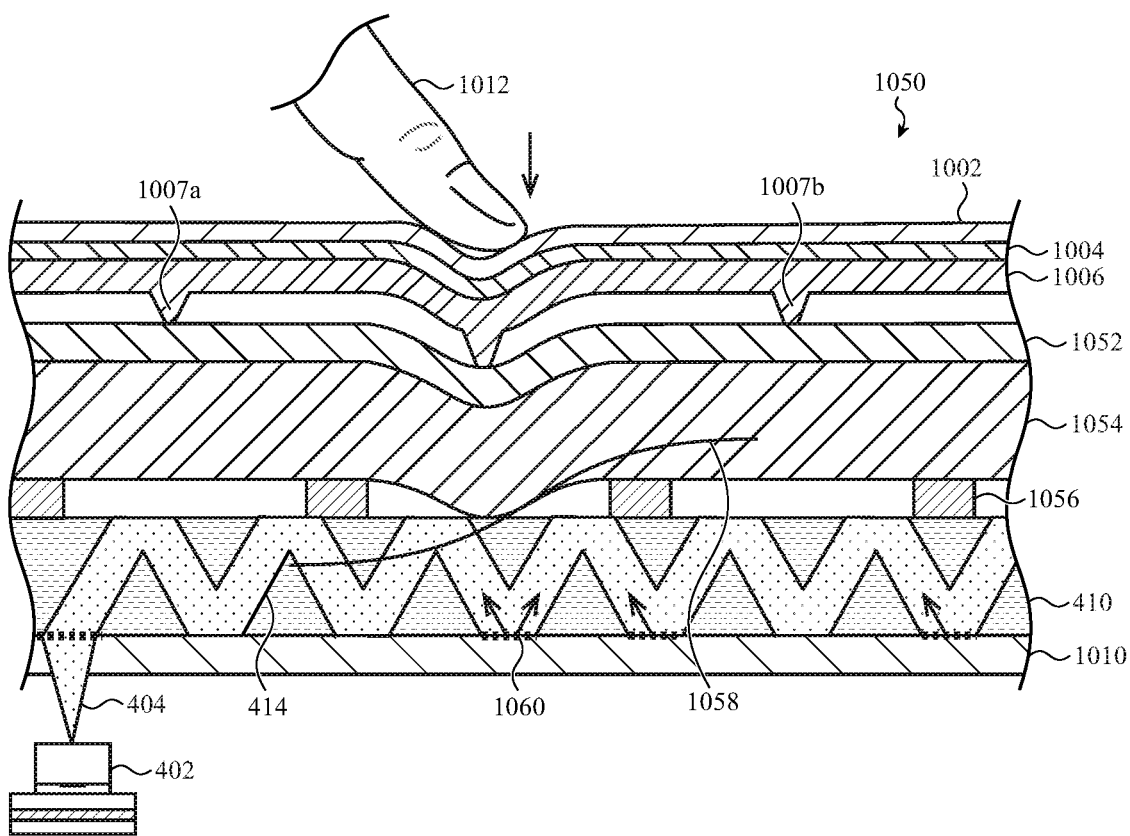
FIG. 10C shows a laser diode, a first optical waveguide, and a second optical waveguide configured to detect user input to a deformable input surface by light leakage from the second optical waveguide into the first optical waveguide through a rigid spacer layer, according to an embodiment.

FIGS. 10A-C show three categories of embodiments that make use of transference of applied pressure on an input surface. The properties of the laser light source can be as described previously. The embodiments can have processing electronics or processors operably coupled with the laser light source that can function to control operation of the laser light source and to measure one or more operational properties thereof.

FIG. 10A shows a cross-section of an electronic device 1000 that includes a laser light source 402, which may be as described previously, configured to insert light 404 into an optical waveguide 410. The inserted light 404 is directed internally into the optical waveguide 410 to become the waveguide light 414. In the embodiment shown, light from the laser light source 402 is inserted through transmissive light in-coupling element 1005 in a single direction. In other embodiments, the insertion may be by any of the mechanisms previously described, such as the reflecting surface 408, a prism, a reflective light in-coupling element, or another mechanism. The optical waveguide 410 may be wholly or partially encased in a low dielectric cladding layer 1010.

The electronic device 1000 can include multiple layers forming a surface above the optical waveguide 410. In the example shown, the electronic device 1000 has an outermost cosmetic coating layer 1002, which may be metallic and function simultaneously as a protective layer. There may also be an absorptive ink coating 1004, which may function to provide isolation for the optical waveguide 410 from external light. The electronic device 1000 includes a pressure transfer layer 1006 between the outermost of the multiple layers forming the surface of the electronic device 1000 and the optical waveguide 410. In the embodiment shown, the pressure transfer layer 1006 is configured as a planar layer from which multiple support ridges, such as support ridges 1007a and 1007b, extend. The pressure transfer layer 1006 is positioned against a soft layer 1008. The material of the soft layer 1008 may be silicone, polydimethylsiloxane (PDMS), or another material. Other embodiments may contain more or fewer layers, which may be made from other materials.

The optical waveguide 410 includes a sequence of partially retroreflective and partially specularly reflective (PRPSR) gratings, such as (PRPSR) gratings 1014a and 1014b. The support ridges of the pressure transfer layer, such as support ridges 1007a and 1007b, may be positioned directly above respective (PRPSR) gratings 1014a, 1014b, according to the orientation shown in FIG. 10A. The (PRPSR) gratings 1014a, 1014b can reflect the waveguide light forward (to the right in FIG. 10A) and backward (to the left in FIG. 10A) through the optical waveguide 410. For example, (PRPSR) grating 1014a reflects the inserted light 404 to become the specularly reflected light 1016 and retroreflected light 1015.

When a press or force input, such as by a user's finger 1012 or a stylus, is applied to the electronic device 1000, the pressed location can deflect or flex inward. The pressure transfer layer 1006 can transfer the applied force to one or more (PRPSR) gratings near the location at which the force was applied. In the embodiment shown, the support ridge 1007b of the pressure transfer layer 1006 can focus the applied force toward the (PRPSR) grating 1014b. In some embodiments, a deflection or inward flex of 0.5 µm-50 µm may suffice for location detection, though this is not required.

The transferred applied pressure can change the grating period or pitch of the (PRPSR) grating 1014b. This change in grating period can modify the retroreflection component $R_{-2}$ of the waveguide light 414 discussed above in relation to FIG. 7. This changed retroreflection can then be detected by the spectrum analysis methods described previously.

FIG. 10B shows a cross-section of an electronic device 1030 that includes a laser light source 402, which may be as described previously, configured to insert light 404 into a primary optical waveguide 410. The inserted light 404 is directed internally into the primary optical waveguide 410 to become the waveguide light 414. The insertion may be by any of the mechanisms previously described, such as the reflecting surface 408, a prism, a transmissive light in-coupling element, a reflective light in-coupling element, or another mechanism. The primary optical waveguide 410 includes a sequence of (PRPSR) gratings, such as retroreflective gratings 1038a and 1038b. The primary optical waveguide 410 may be shielded, at least in part, by a first low dielectric cladding layer 1010.

The electronic device 1030 can include multiple layers forming a surface above the primary optical waveguide 410. In the example shown, the electronic device 1030 has an outermost cosmetic coating layer 1002, which may be metallic and function simultaneously as a protective layer. There may also be an absorptive ink coating 1004, which may function to provide isolation for the primary optical waveguide 410 from external light. The electronic device 1030 includes a pressure transfer layer 1006 between the outermost of the multiple layers forming the surface of the electronic device 1030 and the optical waveguide 410. In the embodiment shown, the pressure transfer layer 1006 is configured as a planar layer from which multiple support ridges, such as support ridges 1007a and 1007b, extend. The pressure transfer layer 1006 is positioned against a second low-index dielectric cladding layer 1034.

The electronic device 1030 includes a secondary optical waveguide 1032. The secondary optical waveguide 1032 may have a flexible planar configuration. The primary optical waveguide 410 may be separated from the secondary optical waveguide 1032 by a soft layer 1008. The soft layer 1008 may be silicone, PDMS, or another material. In some embodiments, the soft layer 1008 may have a thickness in the range 0.5-10 µm, though this is not required.

When a press or force is applied to the electronic device 1030, such as by a user's finger 1012, the pressure can be transferred by the pressure transfer layer 1006 to the second low-index cladding layer 1036. This can compress the soft layer 1008 and so reduce the distance between the primary optical waveguide 410 and secondary optical waveguide 1032. The reduced distance can increase a light leakage 1036 from the primary optical waveguide 410 into the secondary optical waveguide 1032, such as by evanescent wave coupling. As a result of the light leakage 1036, less optical power is reflected by the (PRPSR) grating located where the soft layer 1008 is compressed; as shown, this occurs for (PRPSR) grating 1038b. This changed optical power can then be detected by the spectrum analysis methods described previously.

FIG. 10C shows a cross-section of an electronic device 1050 that includes a laser light source 402, which may be as described previously, configured to insert light 404 into a primary optical waveguide 410. The inserted light 404 is directed internally into the primary optical waveguide 410 to become the waveguide light 414. The insertion may be by any of the mechanisms previously described, such as the reflecting surface 408, a prism, a transmissive light in-coupling element, a reflective light in-coupling element, or another mechanism. The primary optical waveguide 410 includes a sequence of (PRPSR) gratings, such as retroreflective grating 1060. The primary optical waveguide 410 may be shielded, at least in part, by a first low dielectric cladding layer 1010.

The electronic device 1050 can include multiple layers forming a surface above the primary optical waveguide 410. In the example shown, the electronic device 1050 has an outermost cosmetic coating layer 1002, which may be metallic and function simultaneously as a protective layer. There may also be an absorptive ink coating 1004, which may function to provide isolation of the primary optical waveguide 410 from external light. The electronic device 1050 includes a pressure transfer layer 1006 between the outermost of the multiple layers forming the surface of the electronic device 1050 and the primary optical waveguide 410. In the embodiment shown, the pressure transfer layer 1006 is configured as described for the embodiment of FIG. 10B. The pressure transfer layer 1006 is positioned against a second low-index dielectric cladding layer 1052.

The electronic device 1050 includes a secondary optical waveguide 1054. The secondary optical waveguide 1054 may have a flexible planar configuration. The primary optical waveguide 410 may be separated from the secondary optical waveguide 1032 by a layer of rigid spacers, such as rigid spacer 1056. The space between the rigid spacers may be a gas or a deformable material. The thickness of the rigid layers may be in the range 0.5-10 µm, though this is not required. In the embodiment shown, the pressure transfer layer 1006 is configured as a planar layer from which multiple support ridges, such as support ridges 1007a and 1007b, extend. The multiple support ridges of the pressure transfer layer 1006 may be positioned to transfer an applied press or force to location between the rigid spacers.

Similar to the embodiment of FIG. 10B, when a press or force is applied to the electronic device 1050, such as by a user's finger 1012, the pressure can be transferred by the pressure transfer layer 1006 to the second cladding layer 1052. This can bend or deflect the secondary optical waveguide 1054 and so reduce the distance between the primary optical waveguide 410 and secondary optical waveguide 1054. The reduced distance can increase a light leakage 1058 from the primary optical waveguide 410 into the secondary optical waveguide 1032, such as by evanescent wave coupling. As a result of the light leakage 1058, less optical power is reflected by the (PRPSR) grating located where secondary optical waveguide 1054 is flexed; as shown, this occurs for retroreflective grating 1060. This changed optical power can then be detected by the spectrum analysis methods described previously.

Various embodiments based on the embodiments discussed in relation to FIGS. 10A-C will be apparent to one skilled in the art. For example, the laser light source may comprise a collimating lens, as described above. For detecting location of a user input press or force on a two-dimensional input surface, the embodiments discussed in relation to FIGS. 10A-C may be shaped according to any of the geometric configurations shown or described in relation to FIGS. 9A-C.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
   an input surface;
   an optical waveguide positioned interior to the electronic device in proximity to the input surface;
   a lens layer positioned between the input surface and the optical waveguide;
   a laser light source operable to insert light into the optical waveguide at an insertion location of the optical waveguide; and
   processing electronics operably coupled with the laser light source; wherein:
      the optical waveguide comprises a plurality of light out-couplers positioned adjacent to respective sensing locations on the input surface at respective distinct distances along the optical waveguide;
      the lens layer focuses light to the respective sensing locations;
      a user input on the input surface, at or near a first sensing location of the respective sensing locations, results in a reflection of light toward the laser light source;
      the reflected light enters the laser light source and a self-mixing of light occurs within the laser light source;
      the self-mixing of light is detectable by the processing electronics; and
      the processing electronics detect a distance between the user input and the laser light source based on the self-mixing of light.

2. The electronic device of claim 1, wherein at least one of the plurality of light out-couplers is a transmissive light grating.

3. The electronic device of claim 1, wherein at least one of the plurality of light out-couplers is a reflective light grating.

4. The electronic device of claim 1, wherein at least one of the plurality of light out-couplers is an in-waveguide Bragg grating.

5. The electronic device of claim 1, wherein the insertion location of the optical waveguide comprises at least one of:
   a prism internal to the optical waveguide that reflects the inserted light into the optical waveguide;
   a reflective in-coupling element; and
   a transmissive in-coupling element.

6. The electronic device of claim 1, wherein:
   the processing electronics apply a spectrum analysis; and
   the processing electronics determine that the user input occurred at the first sensing location based on a change in at least one property of the spectrum analysis.

7. The electronic device of claim 6, wherein the processing electronics comprise an optical phase locked loop, wherein:
   the optical phase locked loop detects a frequency component of the spectrum analysis corresponding to light reflected from a reflector positioned at an end of the optical waveguide; and
   the processing electronics adjust the laser light source based on the detected frequency component of the spectrum analysis corresponding to the light reflected from the reflector so that the light varies with linear wavelength modulation.

8. The electronic device of claim 1, wherein the plurality of light out-couplers are positioned serially along the optical waveguide.

9. The electronic device of claim 1, wherein:
   the optical waveguide comprises multiple branches; and
   each branch of the multiple branches comprises at least one light out-coupler.

10. The electronic device of claim 1, wherein:
    the laser light source comprises a photodetector;
    an operational parameter of the laser light source is an optical power of light detected by the photodetector; and
    the operational parameter of the laser light source changes in response to the self-mixing of light.

11. The electronic device of claim 1, wherein the lens layer comprises a plurality of lenses so that a respective lens is positioned adjacent to each of the plurality of light out-couplers.

12. The electronic device of claim 1, wherein the self-mixing of light changes a property of the light within the laser light source, with respect to the light initially inserted by the laser light source.

13. An electronic device, comprising:
    an input surface comprising a reflective coating;
    a laser light source configured to emit a laser light;
    an optical waveguide positioned in proximity to the reflective coating and configured to receive the laser light, the optical waveguide comprising multiple sensing locations and a reflector configured to reflect the laser light emitted from the laser light source back into the laser light source in response to a user input at a first sensing location of the multiple sensing locations;
    a lens layer positioned between the input surface and the optical waveguide; and
    processing electronics operably coupled with the laser light source, wherein: the lens layer focuses light to the multiple sensing locations:
       a self-mixing of light occurs within the laser light source; and
       the processing electronics detect a distance between the user input and the laser light source based on the self-mixing of light.

14. The electronic device of claim 13, wherein:
the optical waveguide further comprises a set of light out-couplers; and
the set of light out-couplers direct portions of the laser light received by the optical waveguide toward the reflective coating.

15. The electronic device of claim 14, wherein at least one of the set of light out-couplers is a transmissive light grating.

16. The electronic device of claim 13, wherein:
the laser light is a first laser light having a first characteristic; and
after the self-mixing of light, the laser light source emits a second laser light having a second characteristic, the second characteristic different from the first characteristic.

17. The electronic device of claim 16, wherein:
the first characteristic is a first wavelength; and
the second characteristic is a second wavelength.

18. The electronic device of claim 16, wherein:
the optical waveguide further comprises a set of light out-couplers; and
the set of light out-couplers direct portions of the second laser light toward the reflective coating.

19. The electronic device of claim 13, wherein:
the laser light source comprises:
a laser cavity;
a first internal reflector disposed on a first end of the laser cavity; and
a second internal reflector disposed on a second end of the laser cavity, the second end opposite from the first end;
the laser cavity is configured to contain cavity light reflected between the first internal reflector and the second internal reflector; and
the cavity light mixes with the laser light after the laser light is reflected back into the laser light source.

20. The electronic device of claim 13, wherein the laser light source comprises:
a laser diode configured to emit the laser light; and
a photodetector configured to detect reflections of the laser light.

* * * * *